(12) United States Patent
Choi et al.

(10) Patent No.: US 10,978,020 B2
(45) Date of Patent: Apr. 13, 2021

(54) DISPLAY APPARATUS AND METHOD OF OPERATING THE SAME

(71) Applicant: SAMSUNG ELECTRONICS CO., LTD., Suwon-si (KR)

(72) Inventors: Hyunseok Choi, Suwon-si (KR); Seungjun Lee, Suwon-si (KR); Yoojin Park, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/227,637

(22) Filed: Dec. 20, 2018

(65) Prior Publication Data

US 2019/0189080 A1 Jun. 20, 2019

(30) Foreign Application Priority Data

Dec. 20, 2017 (KR) .......... 10-2017-0176477
Dec. 17, 2018 (KR) .......... 10-2018-0162789

(51) Int. Cl.
*G09G 5/00* (2006.01)
*G06F 11/14* (2006.01)

(52) U.S. Cl.
CPC .......... *G09G 5/006* (2013.01); *G06F 11/1417* (2013.01); *G06F 2201/81* (2013.01); *G09G 2330/026* (2013.01); *G09G 2330/027* (2013.01); *G09G 2354/00* (2013.01)

(58) Field of Classification Search
CPC ............ G06F 11/1417; G06F 2201/81; G09G 2330/026; G09G 2330/027; G09G 2354/00; G09G 5/006
See application file for complete search history.

(56) References Cited

U.S. PATENT DOCUMENTS

| | | | | |
|---|---|---|---|---|
| 5,557,777 | A * | 9/1996 | Culbert | G06F 1/30 700/293 |
| 7,817,769 | B2 | 10/2010 | Poisner | |
| 9,684,519 | B2 | 6/2017 | Wu et al. | |
| 2006/0007225 | A1 | 1/2006 | Kim | |
| 2008/0151127 | A1 | 6/2008 | Ryou | |
| 2011/0037993 | A1* | 2/2011 | Lee | G06F 9/4418 358/1.14 |
| 2012/0079328 | A1 | 3/2012 | Sawaguchi | |
| 2014/0082724 | A1* | 3/2014 | Pearson | G06F 21/575 726/22 |

(Continued)

FOREIGN PATENT DOCUMENTS

| | | |
|---|---|---|
| KR | 10-2006-0000341 A | 1/2006 |
| KR | 10-2010-0052647 A | 5/2010 |
| KR | 10-2015-0098624 A | 8/2015 |

OTHER PUBLICATIONS

Communication dated Jun. 26, 2019 issued by the European Intellectual Property Office in counterpart European Application No. 18214717.3.

(Continued)

*Primary Examiner* — Dmitriy Bolotin
(74) *Attorney, Agent, or Firm* — Sughrue Mion, PLLC

(57) ABSTRACT

A display apparatus and method of operating thereof in which a cold booting of the display apparatus is performed based on at least one of previous waiting times and operating times of the display apparatus.

17 Claims, 20 Drawing Sheets

(56) References Cited

U.S. PATENT DOCUMENTS

| | | | |
|---|---|---|---|
| 2014/0281452 A1* | 9/2014 | Friedman | G06F 11/1417 |
| | | | 713/2 |
| 2015/0143098 A1* | 5/2015 | Arnold | G06F 8/654 |
| | | | 713/2 |
| 2015/0253834 A1* | 9/2015 | Park | G09G 5/00 |
| | | | 345/211 |
| 2017/0220357 A1* | 8/2017 | Choi | G09G 5/36 |
| 2017/0277245 A1* | 9/2017 | Paley | G06F 11/3034 |

OTHER PUBLICATIONS

Search Report and Written Opinion dated Apr. 5, 2019, issued by the International Searching Authority in International Application No. PCT/KR2018/016333 (PCT/ISA/210 and PCT/ISA/237).
Communication dated Nov. 24, 2020 issued by the Indian Patent Office in counterpart Indian Application No. 201844048292.

* cited by examiner

FIG. 8
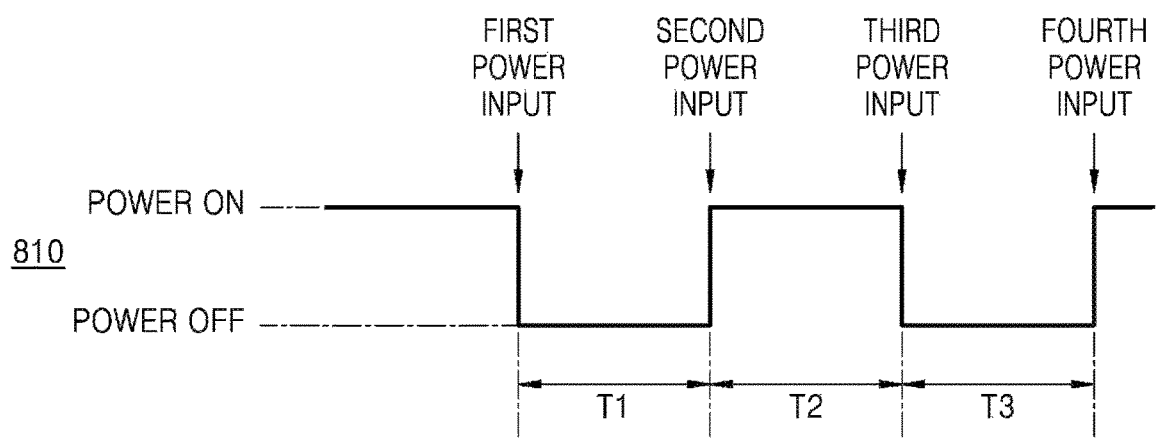
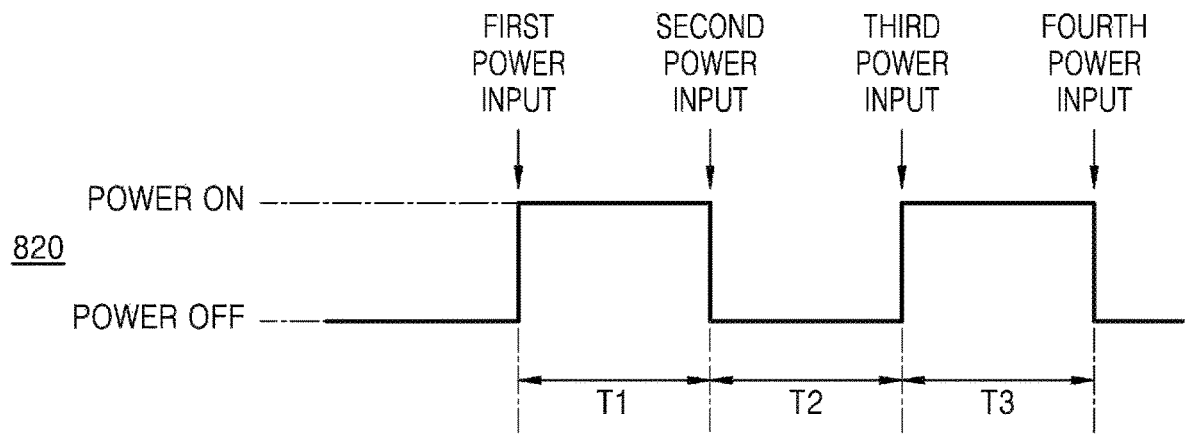

DISPLAY APPARATUS AND METHOD OF OPERATING THE SAME

CROSS-REFERENCE TO RELATED APPLICATION(S)

This application is based on and claims priority under 35 U.S.C. § 119 to Korean Patent Application Nos. 10-2017-0176477, filed on Dec. 20, 2017, and 10-2018-0162789, filed on Dec. 17, 2018, in the Korean Intellectual Property Office, the disclosure of which is incorporated by reference herein in its entirety.

BACKGROUND

1. Field

The disclosure relates to display apparatuses and methods of operating the display apparatuses, and more particularly, to display apparatuses for performing error recovery and methods of operating thereof.

2. Description of Related Art

An image display apparatus, such as a television, displays an image that is viewable to a user. The user may view a broadcast received by the image display apparatus. The broadcast is among broadcast signals transmitted from a broadcasting station and is selected by the user. Recently, broadcasting is globally in transition from analogue broadcasting to digital broadcasting.

Digital broadcasting refers to broadcasting in which a digitized image and an audio signal are transmitted. Compared to analog broadcasting, digital broadcasting is more resistant to external noise and thus has little data loss, may easily correct errors, and provides a clear high-definition screen. Also, unlike analog broadcasting, digital broadcasting supports bi-directional communication between the image display apparatus and the broadcasting provider.

Recently, a smart television (TV) that provides a digital broadcasting function and various supplemental contents has been developed. A smart TV may not be manually operated according to a user selection, and may be designed to analyze and provide user-preferred content without direct user manipulation.

When an error occurs during the operation of a display apparatus, the user may power cycle the display apparatus key for error recovery. However, when the display apparatus has a suspend-to-ram function or an instant-on boot function, error recovery may be difficult even when power cycling is performed.

SUMMARY

Provided are display apparatuses for performing a cold-booting operation to predict occurrence of an error in a display apparatus in consideration of a user operation pattern when the display apparatus receives a user power on/off input and accordingly recover the error, and methods of operating the display apparatuses.

Additional aspects will be set forth in part in the description which follows and, in part, will be apparent from the description, or may be learned by practice of the presented embodiments.

In accordance with an aspect of the disclosure, there is provided a display apparatus including: a user input interface; a memory storing one or more instructions; and a processor configured to execute the one or more instructions stored in the memory to: receive a power input of the display apparatus via the user input interface, in response to receiving the power input, obtain operating time information of the display apparatus, the operating time information of the display apparatus comprising at least one of: information about one or more operation times of the display apparatus prior to receiving the power input and information about one or more waiting times of the display apparatus prior to receiving the power input, determine whether to perform a cold-booting operation based on the operating time information, and perform the cold-booting operation in response to determining to perform the cold-booting operation.

The apparatus may include a volatile memory, and the cold-booting operation includes an operation of a cold power-off the display apparatus in which power to the volatile memory is discontinued, and an operation of booting the display apparatus.

The power input may include a first power input and a second power input, wherein the processor is further configured to execute the one or more instructions to: in response to receiving the second power input, obtain first time information indicating a time between the first power input and the second power input, determine whether the first time information corresponds to a predetermined first pattern, and determine whether to perform the cold-booting operation of the display apparatus based on whether the first time information corresponds to the predetermined first pattern.

When the first power input is an input to power-off of the display apparatus and the second power input is an input to power-on of the display apparatus, the first time information may indicate a waiting time of the display apparatus, and wherein when the first power input is an input to power-on of the display apparatus and the second power input is an input to power-off of the display apparatus, the first time information indicates an operation time of the display apparatus.

The processor may be further configured to execute the one or more instructions to determine that the first time information corresponds to the predetermined first pattern when the first time information is less than a first threshold value.

The first threshold value may be updatable by a server or according to a result determined by machine learning.

The power input may include a first power input, a second power input, and a third power input, and wherein the processor is further configured to execute the one or more instructions to: in response to receiving the third power input, obtain first time information indicating a time between the first power input and the second power input and second time information indicating a time between the second power input and the third power input, determine at least one of: whether the first time information corresponds to a predetermined first pattern and whether the second time information corresponds to a predetermined second pattern, and determine whether to perform the cold-booting operation of the display apparatus in accordance with a determination result as to whether the at least one of the first time information corresponds to the predetermined first pattern and the second time information corresponds to the predetermined second pattern.

The processor may be further configured to execute the one or more instructions to determine to perform the cold-booting operation when it is determined that the first time information is less than a first threshold value and the second time information is less than a second threshold value.

The processor may be further configured to execute the one or more instructions to determine to perform the cold-booting operation when it is determined that the first time information is less than a first threshold value or the second time information is less than a second threshold value.

The power input may include a first power input and a second power input, and wherein the processor is configured to execute the one or more instructions to: in response to receiving the first power input, switch to an information mode in which information is displayed on a display by executing a predetermined application set to be executed in correspondence to the first power input, and in response to receiving the second power input, switch to a normal mode in which an application that was being executed on the display apparatus before the first power input is continuously executed. In the normal mode, an application displaying broadcast content may be executed, and thus the broadcast content may be displayed, wherein when the first power input is received during execution of the application displaying the broadcast content in the normal mode, the execution of e application displaying the broadcast content may be stopped, and a predetermined application or widget set to execute in response to the first power input may be executed.

In accordance with an aspect of the disclosure, there is provided a method of operating a display apparatus including: receiving a power input of the display apparatus; in response to receiving the power input, obtaining operating time information of the display apparatus, the operating time information of the display apparatus comprising at least one of: information about one or more operation times of the display apparatus prior to receiving the power input and information about one or more waiting times of the display apparatus prior to receiving the power input; determining whether to perform a cold-booting operation based on the operating time information; and performing the cold-booting operation in response to determining to perform the cold-booting operation.

In accordance with another aspect of the disclosure, a non-transitory computer-readable recording medium having recorded thereon a program for executing a method of operating a display apparatus is provided.

In accordance with an aspect of the disclosure, there is provided an electronic apparatus comprising: a volatile memory, a nonvolatile memory, and a processor configured to execute one or more instructions to: receive a power on input of the electronic apparatus, obtain a time duration between the power on input and a power off input before the power on input, and perform a cold booting control or a warm booting control according to the obtained time duration.

The processor may comprise a CPU and a microcomputer, and the microcomputer may be configured to: count the time duration between the power on input and a power off input before the power on input, determine whether the counted time duration is equal to or less than a threshold value, when it is determined that the time duration is equal to or less than the threshold value, block a power supply to the volatile memory and perform the cold booting control by instructing the CPU to perform a cold booting operation, and when it is determined that the time duration exceeds the threshold, perform the warm booting control by instructing the CPU to perform a warm booting operation.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a reference diagram for explaining various user patterns recognized to determine whether cold-booting is required when a display apparatus receives a power key input according to embodiments;

DETAILED DESCRIPTION

Figure 1:
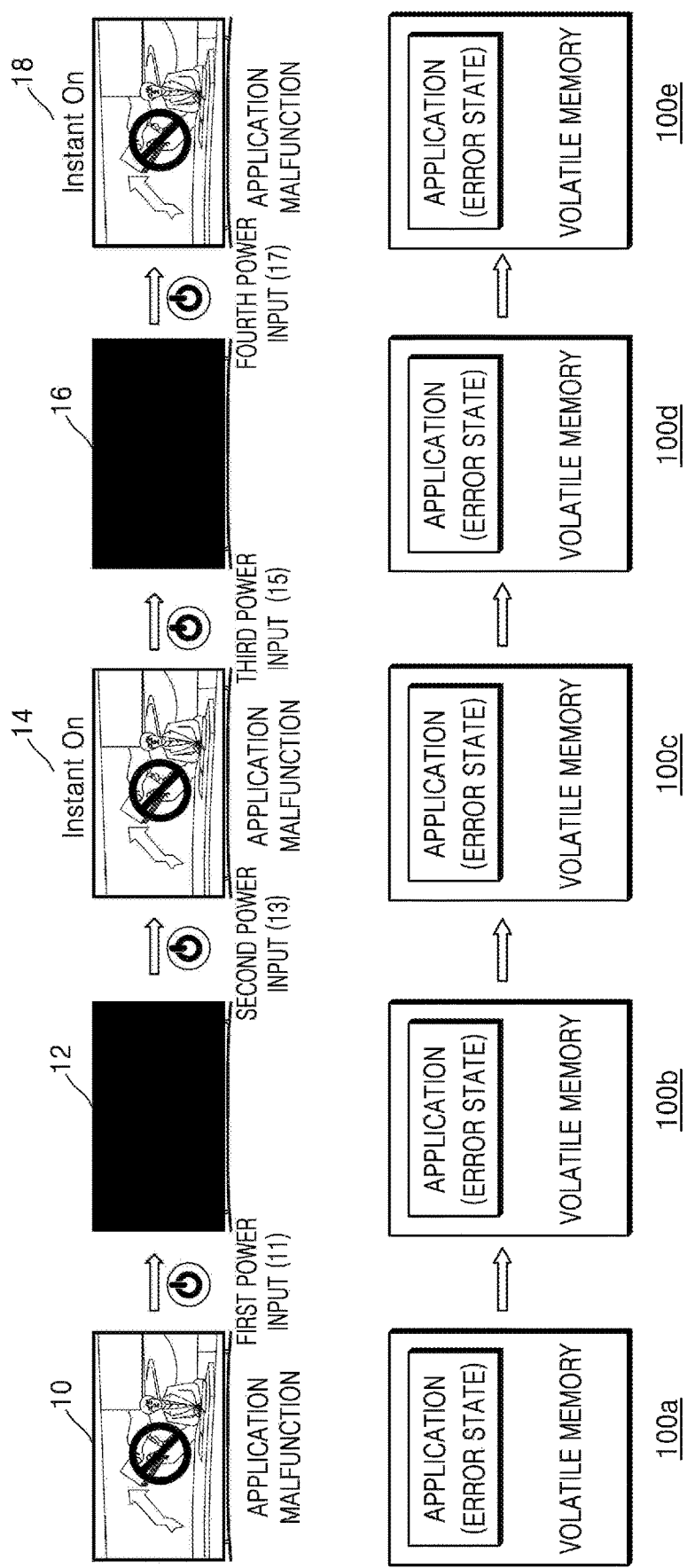
FIG. 1 is a reference diagram for explaining a concept according to embodiments.

Hereinafter, terms that are used in the specification will be briefly described, and embodiments will be described in detail.

All terms including descriptive or technical terms which are used herein should be construed as having meanings that are understood to one of ordinary skill in the art. However, the terms may have different meanings according to an intention of one of ordinary skill in the art, precedent cases, or the appearance of new technologies. Also, some terms may be selected by the applicant, and in this case, the meaning of the selected terms will be described in detail in the detailed description of embodiments. Thus, the terms used herein have to be defined based on the meaning of the terms together with the description throughout the specification.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or embodied by combining hardware and software.

The embodiments will now be described more fully with reference to the accompanying drawings. However, the embodiments may be embodied in many different forms, and should not be construed as being limited to the embodiments set forth herein. Rather, these embodiments are provided so that this disclosure will be thorough and complete, and will fully convey the concept of the embodiments to one of ordinary skill in the art. In the following description, well-known functions or constructions are not described in detail because they would obscure the embodiments with unnecessary detail, and like reference numerals in the drawings denote like or similar elements throughout the specification. As used herein, the term "and/or" includes any and all combinations of one or more of the associated listed items. Expressions such as "at least one of," when preceding a list of elements, modify the entire list of elements and do not modify the individual elements of the list.

The term "user" in the present description means a person who controls a function or an operation of an image display apparatus, for example by using a control device or hardware inputs of the display apparatus, and may include a viewer, an administrator, or an installation engineer.

FIG. 1 is a reference diagram for explaining a concept according to embodiments.

When an operation error occurs during use of a television (TV), the TV may be generally powered off by pressing a hardware power key integrated with the TV or via a signal received from a remote control of the TV when a user presses a power on/off key on the remote control. Similarly, the TV may be powered on by pressing the hardware power key again or via the signal received from the remote control of the TV. Thus the TV may normally operate by rebooting (power cycling) the TV. Alternatively, when an AC power source of the TV is detached, for example by disconnection of a power cable to an electrical power supply, and the TV is rebooted, the TV may normally operate again.

However, there is a problem in that an operation error state is maintained, even when a user powers off the TV with the power key and then powers on the TV again, when an instant on function or a suspend to RAM function is implemented within the TV. In particular, in the case of a third party application, rather than a native application managed by the TV itself, it may be difficult to correct an error via an error recovery system of the TV itself.

The instant on function or the suspend to RAM function is a booting method in which, when the TV receives the power key during operation, software such as an operating application stops the operation of a system clock while the software remains in a volatile memory (RAM) such that an application stored in the volatile memory (RAM) does not operate. And, when the remaining hardware components are turned off and then the power key is received, the TV resumes the operation of the system clock such that a software code stored in the volatile memory (RAM) operates as loaded, thereby reducing the time for executing the software. The technology in which the software remains in the volatile memory utilizes a self-refresh technology provided by DRAM. The suspend to RAM technology is referred to as a S3 or deep sleep technology.

When a display apparatus with an instant on function or a suspend to RAM function is powered off, the display apparatus interrupts power supply to most internal components including a display screen, but may supply a minimum amount of power to the volatile memory storing an application that is being executed. By supplying the minimum amount of power to the volatile memory, the display apparatus may maintain the application that was being executed in the display apparatus in the volatile memory before the power-off operation even in a power-off state of the display apparatus. Maintaining content of the volatile memory by supplying the minimum amount of power to the volatile memory even in the power-off state of the electronic apparatus is referred to as a suspend to RAM mode. When a power-on input is received, the display apparatus may execute the application that was being executed prior to the power-off operation of the display apparatus by using the application maintained in the volatile memory upon booting the display apparatus and display an execution screen on a display. Accordingly, the user may confirm that the application that was being executed before the power-off operation of the display apparatus is displayed on the display apparatus together with an execution state of the application according to the power-on operation of the display apparatus.

Referring to FIG. 1, a display apparatus may malfunction 10 during execution of an application. At this time, a user may perform a first power input 11 for an operation recovery, power off 12 the display apparatus, then perform a second power input 13, and power on 14 the display apparatus. Thereby, a soft reboot occurs. However, because an instant on function or a suspend to RAM function of the display apparatus maintains a state of software stored in volatile memory 100*a*, 100*b*, and 100*c* when the display apparatus is powered off, the application may be continuously executed in such a software error state when the display apparatus is powered on again, and thus, an error may be maintained.

Even when the user performs a third power input 15 again for an error correction, powers off the display apparatus 16, performs a fourth power input 17 again, and powers on the display apparatus 18, because the application in an error state stored in volatile memory 100*d* and 100*e* is maintained, the display apparatus with the instant on function or the suspend to RAM function may be powered on in a state in which an operation error is not corrected. When the error of the display apparatus repeatedly occurs, there is a problem in that the user is forced to finally detach an AC power source from the display apparatus and perform a hard reboot or a cold reboot of the display apparatus.

The present embodiments relate to a method performed by a display apparatus having an instant on function or a suspend to RAM function to determine a power key input operation pattern of a user, determine whether to cold-reboot the display apparatus at a next time, and automatically recover an operating system of the display apparatus. Cold-booting operation comprises a cold power-off operation and then a booting operation. In the cold power-off operation, a power to a volatile memory in the display apparatus discontinues and thus contents stored in the volatile memory can be removed. Therefore, when booting of the display apparatus, the display apparatus performs an initial operation by loading an operating system program stored in a non-volatile memory to the volatile memory.

Figure 2:
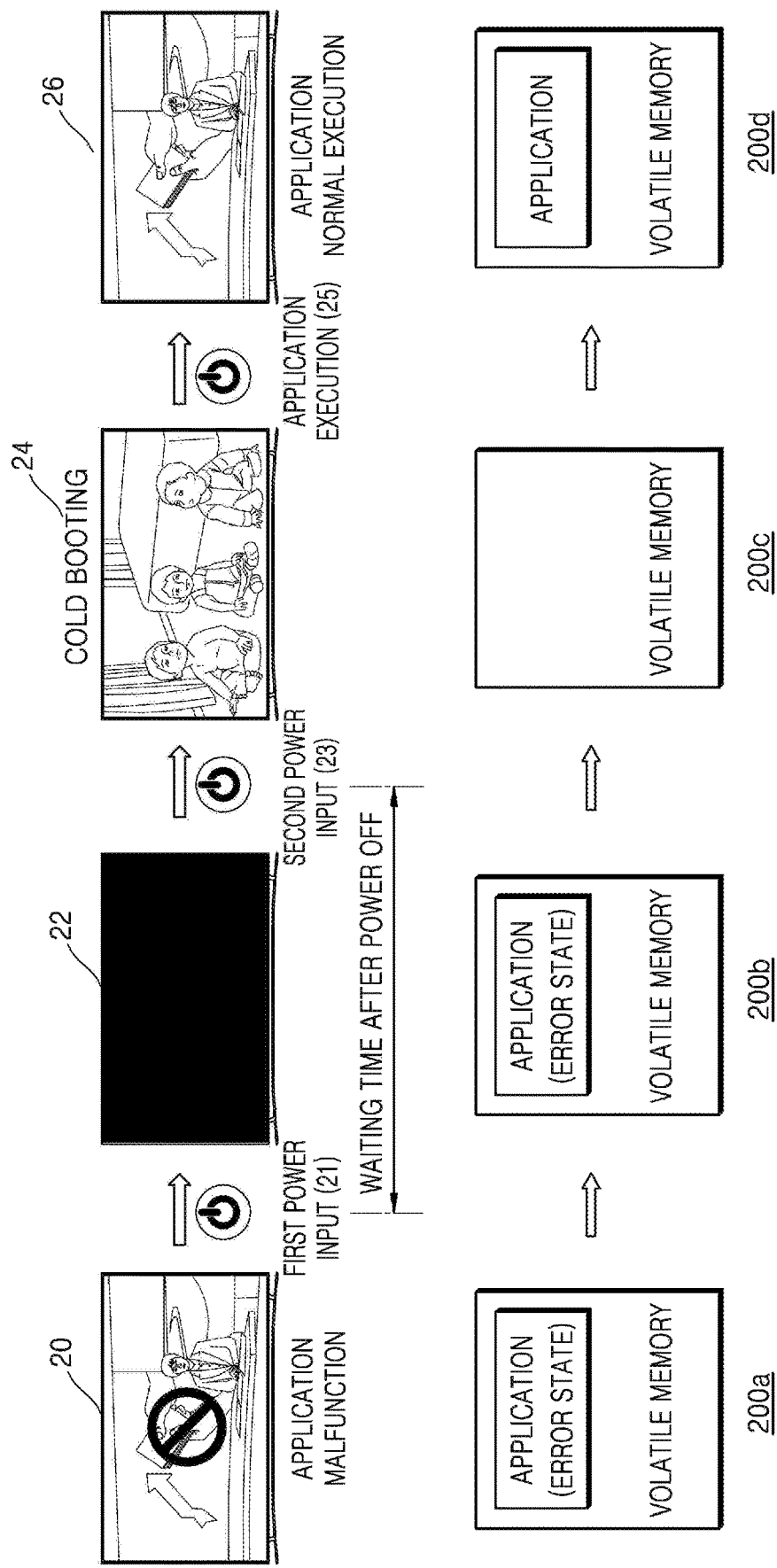
FIG. 2 is a reference diagram for explaining an example of a system recovery method according to an embodiment.

FIG. 2 is a reference diagram for explaining an example of a system recovery method according to an embodiment.

Referring to FIG. 2, a display apparatus may malfunction 20 during execution of an application. That is, a volatile memory 200a of the display apparatus may store the executing application in an error state. At this time, a user may perform a first power input 21 for an operation recovery, power off 22 the display apparatus, and perform a second power input 23 to activate the display apparatus. Assuming that the display apparatus implements an instant on booting function, the application loaded in volatile memory 200a may be stored in the volatile memory 200a in the error state because a storage state of volatile memory 200b is maintained. In other words, even though the display apparatus is turned off by the user, because power is maintained to the volatile memory 200b, a complete reset of the volatile memory 200b and the loaded application and the state thereof stored in the volatile memory 200b is not performed. At this time, the display apparatus according to an embodiment may monitor a time from the first power input 21 to the second power input 22, that is, a waiting time T1 after the display apparatus is powered off. When the second power input 22 is received, the display apparatus may determine whether the monitored waiting time T1 corresponds to a predetermined pattern. Whether the waiting time T1 corresponds to the predetermined pattern may be determined according to, for example, whether the waiting time T1 is less than a predetermined threshold value. When the waiting time T1 corresponds to the predetermined pattern, the display apparatus may determine that an error has occurred in the display apparatus and may perform cold-booting 24 for error recovery in which power is discontinued to the volatile memory. Because content of volatile memory 200c of the display apparatus is erased by cold-booting 24, the software error state of the volatile memory may be eliminated. Accordingly, when the application is executed 25 according to a user input after cold-booting 24, the display apparatus may normally execute an application 200d and normally display the executed application on a display 26.

Figure 3:
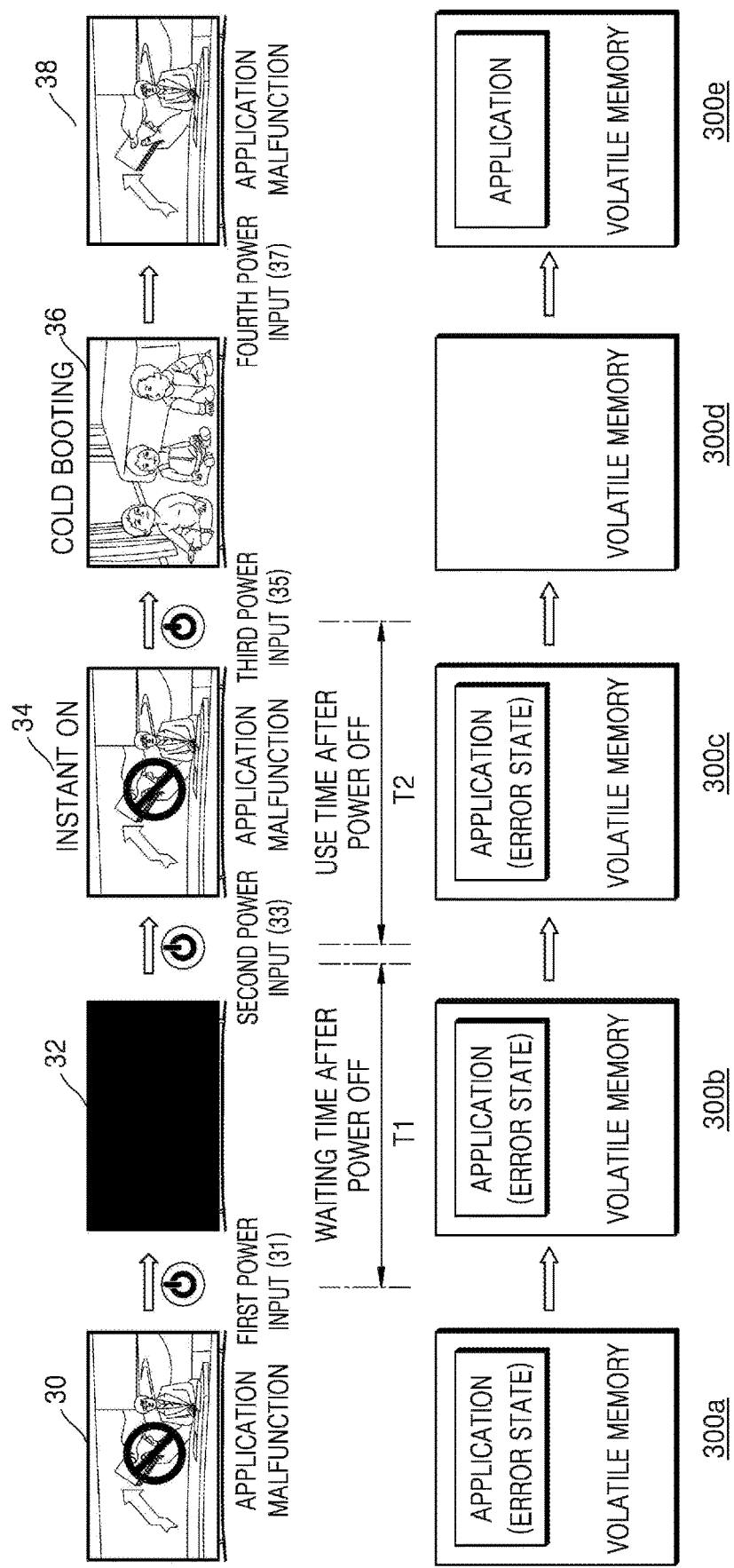
FIG. 3 is a reference diagram for explaining an example of a system recovery method according to an embodiment.

FIG. 3 is a reference diagram for explaining an example of a system recovery method according to an embodiment.

Referring to FIG. 3, a display apparatus may malfunction 30 during execution of an application. At this time, a user may perform a first power input 31 for an operation recovery, power off 32 the display apparatus, and perform a second power input 33. According to the second power input 33, the display apparatus may instant-on boot 34 and may be recovered in a state in which the malfunctioning application is maintained. Accordingly, the user may again perform a third power input 35 to power off the display apparatus having the application in the malfunctioning state. At the time priors to the third power input 35, volatile memory 300a, 300b, and 300c of the display apparatus may maintain the application in an error state.

At this time, the display apparatus according to an embodiment may monitor a time from the first power input 31 to the second power input 33, that is, the waiting time T1 after power off, and a time from the second power input 33 to from the third power input 35, that is, a time T2 after power on. When the third power input 35 is received, the display apparatus may determine whether at least one of the monitored waiting times T1 and T2 corresponds to a predetermined pattern. That is, if the time between power inputs is sufficiently quick, the display apparatus may determine that a reset of the display apparatus is necessary in which power is discontinued from the volatile memory.

According to an example, the display apparatus may determine whether the waiting times T1 and T2 respectively correspond to a predetermined first pattern and a predetermined second pattern.

According to an example, the display apparatus may determine whether the waiting time T1 corresponds to the first predetermined pattern or whether the waiting time T2 corresponds to the predetermined second pattern.

According to an example, the display apparatus may determine whether the waiting time T2 corresponds to the predetermined second pattern.

When the waiting times T1 and T2 respectively correspond to the predetermined first and second patterns, the display apparatus may determine that an error has occurred in the display apparatus and perform cold-booting 36 for error recovery. Because a software error state of volatile memory 300d of the display apparatus may be removed by cold-booting 36 in which power is discontinued from the volatile memory, when the execution of the application of the display apparatus is requested 37, the display apparatus may load the requested application into a volatile memory 300e, newly load and execute the application, and display 38 the application on a display. Thereby, an error condition of the application executed by the display apparatus may be corrected even though the application may be a non-native third party application that the display apparatus is not specifically configured to manage.

Figure 4:
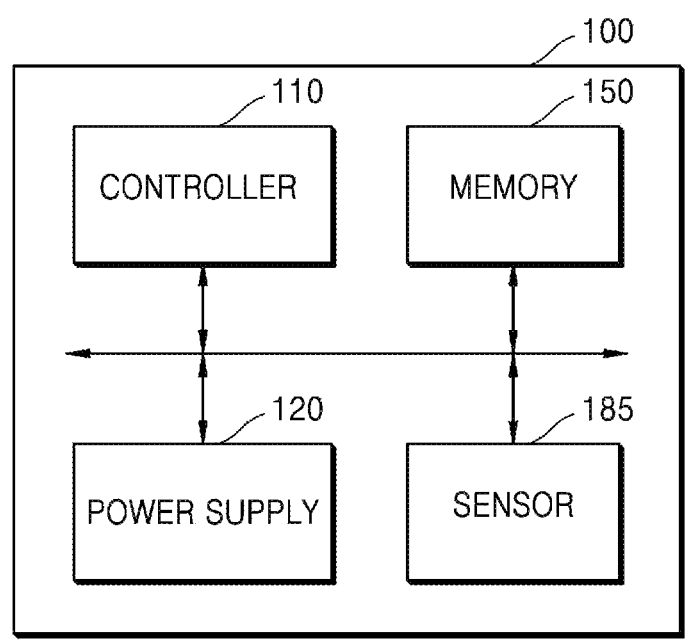
FIG. 4 is a schematic block diagram of a display apparatus according to an embodiment.

FIG. 4 shows a schematic block diagram of a display apparatus 100 according to an embodiment.

Referring to FIG. 4, the display apparatus 100 may include a controller 110, a power supply 120, a memory 150, and a sensor 185, which may be coupled by one or more busses and wired connections.

The display apparatus 100 may be implemented as any one of various electronic apparatuses, such as a television, a desktop PC, a handheld PA, a personal information terminal, and the like, but the display apparatus is not limited thereto. The display apparatus may be any apparatus having an instant on function or a suspend to RAM function, or similar functionality, and in which a non-native application is installed therein.

The display apparatus 100 may operate in a power saving mode in a power management function. Specifically, the display apparatus 100 may operate in a suspend to RAM mode in the power management function. The suspend to RAM mode is a mode in which, when a system enters a low power state, power supply to most components of the system is interrupted, whereas power supply to a main memory, which is a volatile memory storing system configuration information, an application being executed, and active files, is maintained. In the suspend to RAM mode, the system may be maintained at low power, and most of the power required at this time may be used to maintain data of the main memory, which may be a volatile memory. In the suspend to RAM mode, the system may be awaken at any time to perform tasks, and thus system startup may be increased because the loaded and executed states of applications in the RAM are maintained.

Cold-booting refers to a process by which a display apparatus is restarted. When the display apparatus is turned on for the first time, the system undergoes a power on self test, and then the operating system is loaded into RAM, which may be a volatile memory. When an operating system program is loaded into the RAM and executed without any abnormality, the display apparatus enters a state to accept a user command, and thus the display apparatus is booted. In the present specification, it is assumed that the display apparatus has the suspend to RAM function or an instant on booting function, or any equivalent function thereof. Thus, cold-booting may refer to cold powering off the display apparatus while removing content stored in the volatile memory by interrupting power supply to at least the volatile memory, and then powering on the display apparatus.

The sensor 185 may include suitable logic, circuitry, interfaces, and/or code that may sense a user input. The user input may include a power input of the display apparatus 100. The power input of the display apparatus 100 may include an input indicative of power on and an input indicative of power off. The power input of the display apparatus 100 may be implemented in a toggle fashion. When a first power input indicates power on, a second power input may indicate power off.

The power supply 120 may include suitable logic, circuitry, interfaces and/or code capable of supplying power to each functional block of the display apparatus 100, and to all of the display apparatus 100 in general. According to the input indicating power on of the display apparatus 100, the power supply 120 may supply power to each component of the display apparatus 100. According to the input indicating power off of the display apparatus 100, the power supply 120 may block or remove power supply to each component of the display apparatus 100. When the display apparatus 100 has the suspend to RAM function or the instant on booting function, the power supply 120 may supply a minimum amount of power to volatile memory included in the memory 150 even when the display apparatus 100 is powered off such that data stored in the volatile memory may be maintained.

The memory 150 may include the volatile memory. The volatile memory is a computer memory that requires electricity to maintain stored information and refers to a general purpose random access memory including dynamic random access memory (DRAM) and static random access memory (SRAM). The volatile memory may store data that is in operation according to the suspend to RAM function.

The controller 110 may include one or more processors and include suitable logic, circuitry, interfaces and/or code that may generally control the components of the display apparatus 100.

According to an embodiment, the controller 110 may receive the power input of the display apparatus 100 and, in response to receiving the power input, obtain one or more pieces of operating time information of the display apparatus 100 before receiving the power input or one or more pieces of waiting time information of the display apparatus 100, determine whether to perform cold-booting by using at least one of the one or more pieces of operating time information and the one or more pieces of waiting time information, and perform cold-booting according to determination. The pieces of operating time information of the display apparatus 100 may be stored in the memory 150, such that the pieces of operating time information of the display apparatus 100 may be retained and accessed even though the display apparatus 100 is rebooted. Alternatively or additionally, the pieces of operating time information of the display apparatus 100 may be stored in non-volatile memory.

According to an embodiment, the power input may include a first power input and a second power input. The controller 110 may obtain first time information indicating a time from the first power input to the second power input in response to receiving the second power input, determine whether the first time information corresponds to a predetermined first pattern, and determine whether to perform rebooting of the display apparatus 100 according to a determination result.

According to an embodiment, when the first power input is an input corresponding to power off of the display apparatus 100 and the second power input is an input corresponding to power on of the display apparatus 100, the first time information may indicate a waiting time of the display apparatus 100, and when the first power input is an input corresponding to power on of the display apparatus 100 and the second power input is an input corresponding to power off of the display apparatus 100, the first time information may indicates an operation time of the display apparatus 100.

According to an embodiment, when the first time information is less than a first threshold value, the controller 110 may determine that the first time information corresponds to the predetermined first pattern.

According to an embodiment, the first threshold value may be updatable by a server or according to a result determined by machine learning.

According to an embodiment, the power input may include the first power input, the second power input, and a third power input. The controller 110 may obtain the first time information indicating the time from the first power input to the second power input in response to receiving the third power input and second time information indicating a time from the second power input to the third power input, determine whether the first time information and/or the second time information corresponds to the predetermined first pattern and/or a predetermined second pattern, and determine whether to perform further cold-booting of the display apparatus 100, in which power to the memory is discontinued, according to determination.

According to an embodiment, when it is determined that the first time information is less than the first threshold value and the second time information is less than a second threshold value, the controller 110 may determine to perform cold-booting in which power to the memory is discontinued.

According to an embodiment, when it is determined that the first time information is less than the first threshold value or the second time information is less than the second threshold value, the controller 110 may determine to perform cold-booting in which power to the memory is discontinued.

According to an embodiment, the power input may include the first power input and the second power input. The controller 110 may switch to an information mode in which information is displayed on a display in response to the first power input, and switch to a normal mode in which broadcast content is displayed on the display in response to the second power input.

Figure 5:
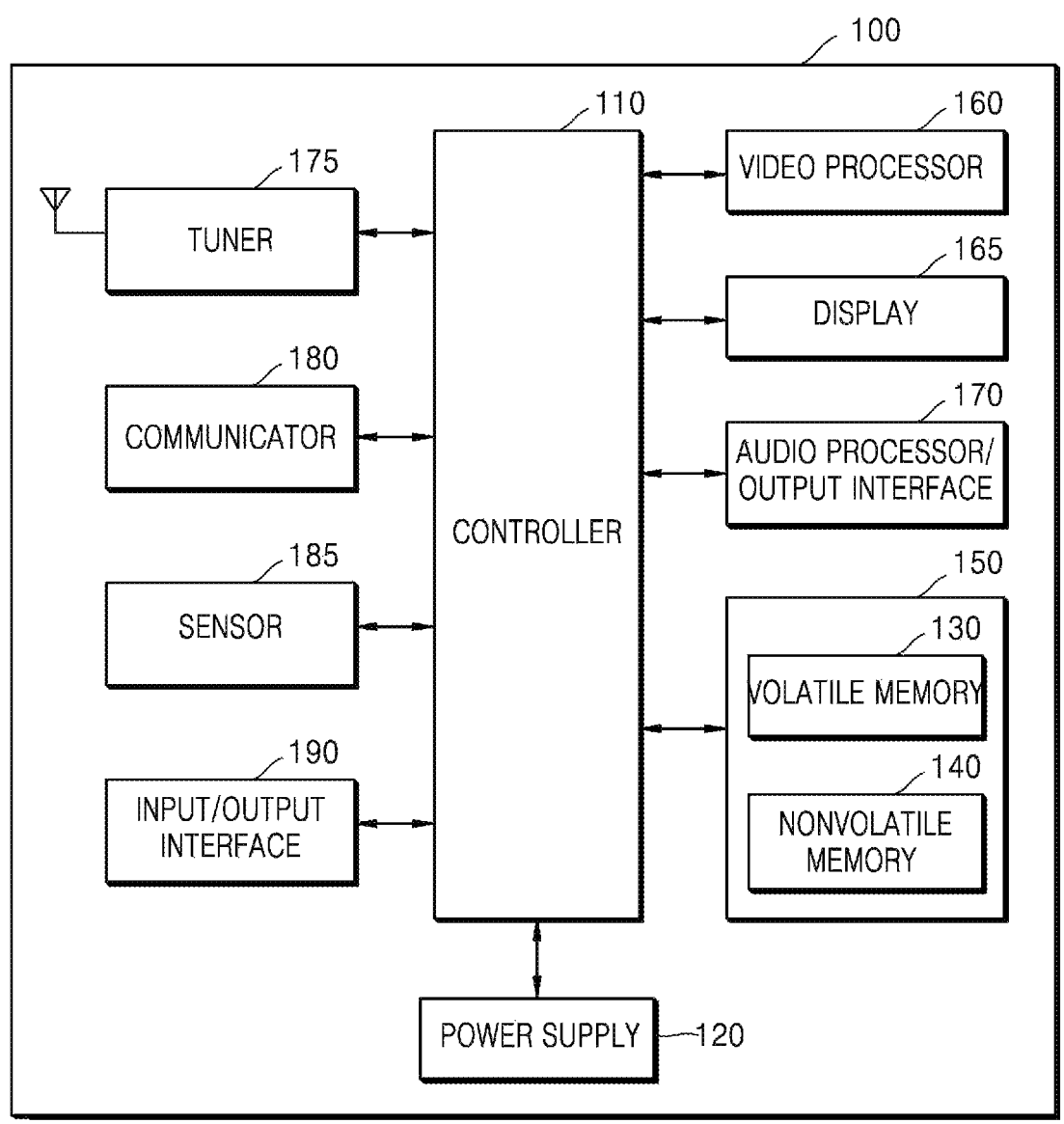
FIG. 5 shows a block diagram of a display apparatus according to an embodiment.

FIG. 5 shows a detailed block diagram of the display apparatus 100 according to an embodiment.

Referring to FIG. 5, the display apparatus 100 may include the controller 110, the power supply 120, a memory 150 including a volatile memory 130 and a nonvolatile memory 140, a video processor 160, a display 165, an audio processor/output interface 170, a tuner 175, a communicator 180, a sensor 185, and an input/output interface 190.

The same descriptions as those described with reference to FIG. 4 will be omitted.

Like FIG. 4, the display apparatus 100 according to an embodiment may be a TV, but this is merely an embodiment and may be implemented in an electronic apparatus including a display. For example, the display apparatus 100 may be implemented in various electronic apparatuses such as a mobile phone, a tablet PC, a digital camera, a camcorder, a laptop computer, a tablet PC, a desktop, an electronic book terminal, a digital broadcast terminal, a personal digital assistant (PDA), a portable multimedia player (PMP), a navigation system, a MP3 player, a wearable device, and the like.

The video processor 160 may include suitable logic, circuitry, interfaces and/or code to enable processing on video data received by the display apparatus 100. The video processor 160 may perform various image processing on the video data such as decoding, scaling, noise filtering, frame rate conversion, resolution conversion, and the like.

The display 165 may display video included in a broadcast signal received through the tuner 175 under the control of the controller 110 on a screen. Also, the display 165 may display content (e.g., a moving image) input through the communicator 180 or the input/output interface 190. The display 165 may output an image stored in the memory 150 under the control of the controller 110.

The display 165 may include suitable logic, circuitry, interfaces, and/or code to generate a driving signal by converting a video signal, a data signal, an on-screen display (OSD) signal, a control signal, or the like which are processed by the controller 110. The display 165 may be embodied as one of a plasma display panel (PDP), a liquid crystal display (LCD), an organic light-emitting display (OLED), a flexible display, or the like, and may also be embodied as a three-dimensional (3D) display. The display 165 may be configured as a touch screen to be used as both an output device and an input device.

The audio processor/output interface 170 may include suitable logic, circuitry, interfaces, and/or code to perform processing on audio data. The audio processor/output interface 170 may perform various processing on the audio data such as decoding and amplification of audio data, noise filtering, and the like. Also, the audio processor/output interface 170 may include at least one of a speaker, a headphone output terminal, or a Sony/Philips Digital Interface (S/PDIF) output terminal for outputting processed audio.

The tuner 175 may include suitable logic, circuitry, interfaces, and/or code to tune and select a frequency of a channel that a user selects to receive via the apparatus 100, wherein the frequency is obtained by tuning, via amplification, mixing, and resonance, frequency components of a broadcasting signal that is received in a wired or wireless manner. The broadcasting signal includes an audio signal, a video signal, and additional information (e.g., an electronic program guide (EPG)).

The communicator 180 may include suitable logic, circuitry, interfaces, and/or code to enable the display apparatus 100 to be communicatively connected to an external apparatus (e.g., an audio apparatus, etc.) under the control of the controller 110. The controller 110 may transmit content to and receive content from the external apparatus connected through the communicator 180, download an application from the external apparatus, or browse the Internet. The communicator 180 may include a wireless LAN interface, a Bluetooth interface, a BLE interface, an NFC interface, a wired Ethernet interface, and the like in correspondence with the performance and structure of the display apparatus 100. Further, the communicator 180 may receive a control signal of a remote control apparatus under the control of the controller 110. The control signal may be implemented as a Bluetooth type, an RF signal type, or a WiFi type.

The sensor 185 may include suitable logic, circuitry, interfaces, and/or code to sense a user's voice, a user's image, or a user's interaction, and may include a microphone, a camera, and a light receiver. The light receiver may receive an optical signal (including the control signal) received from the external remote control apparatus to power on/off the display apparatus 100. For example, the light receiver may receive a power on input or a power off input of the display apparatus 100 from the external remote control apparatus.

The input/output interface 190 may include suitable logic, circuitry, interfaces, and/or code to receive video (e.g., a moving image), audio (e.g., voice and music) and additional information (e.g., EPG, etc.) from outside the display apparatus 100 under the control of the controller 110. The input/output interface 190 may include one or a combination of a High-Definition Multimedia Interface (HDMI) port), a component jack, a PC port, and a USB port.

The memory 150 may include suitable logic, circuitry, interfaces, and/or code to store various data, programs, or applications for driving and controlling the display apparatus 100 under the control of the controller 110. For example, applications, programs, and/or data may be stored in non-volatile memory 140 and loaded into volatile memory 130 for execution by the controller 110. The memory 150 may store input/output signals or data corresponding to driving of each component of the display apparatus 100.

The memory 150 may store an operating system for a control operation by the image display apparatus 200 and the controller 110, a native application that is originally provided by a manufacturer or is downloaded from an external source, a non-native application downloaded from an external source, a graphical user interface (GUI) related to the application, an object (e.g., an image text, an icon, a button, etc.) for providing the GUI, user information, documents, databases, or related data.

The memory 150 may include the volatile memory 130 and the nonvolatile memory 140.

The volatile memory 130 refers to a memory that maintains stored information only in a state where power supply is maintained and may include a DRAM, SRAM, and the like.

The nonvolatile memory (NVM or NVRAM) 140 is a computer memory that continuously maintains stored information even when no power is supplied thereto and may include a ROM, a flash memory, a memory card (for example, a micro SD card and a USB memory), a hard disk drive (HDD), or a solid state drive (SSD).

The volatile memory 130 may store input/output data related to an application system loaded when a system is booted, one or more application programs being executed, and execution of application. When a suspend to RAM function is implemented by the display apparatus 100, because power supply to the volatile memory 130 is maintained upon power off of the display apparatus 100, content of the volatile memory 130 may be continuously maintained even during power off of the display apparatus 100, and thus a processor may fetch and execute the content stored in the volatile memory 130 upon power on of the display apparatus 100. When the display apparatus 100 is cold (hard) powered off or performs rebooting, because the power supply to the volatile memory 130 is interrupted or discontinued, the stored content is not retained in the volatile memory 130 when the display apparatus 100 is powered on or performs rebooting after cold (hard) powered off, and thus an error in the stored application may also be removed.

According to an embodiment, the memory 150 may include a power management module and a waiting time/operation time management module.

The power management module may include one or more instructions to obtain the one or more pieces of operation time information of the display apparatus 100 or the one or more pieces of waiting time information of the display apparatus 100 before receiving a power input, in response to receiving the power input, determine whether to perform cold-booting by using at least one of the one or more pieces of operation time information and the one or more pieces of waiting time information, and control cold-booting according to determination. More specifically, the power management module may include one or more instructions to perform a function of the controller 110 described with reference to FIG. 4 above.

The waiting time/operation time management module may manage and acquire the operation time information indicating the time from power on of the display apparatus 100 to power off and the waiting time information indicating the time from power off of the display apparatus 100 to power on.

The controller 110 may include one or more processors and may include suitable logic, circuitry, interfaces, and/or code to control the general operation of the display apparatus 100 and the signal flow between the internal components of the display apparatus 100 and to perform a function of processing data. The controller 110 may execute an operating system (OS) and various applications stored in the memory 150 when a user input is present or predefined and stored conditions are satisfied.

According to an embodiment, the controller 110 may perform various operations according to the embodiments disclosed herein by performing the one or more instructions included in the power management module and the waiting time/operation time management module to be stored in the memory 150.

Meanwhile, the block diagram of the display apparatus 100 is a block diagram for an embodiment. Each component of the block diagram may be integrated, added, or omitted according to the specifications of the display apparatus 100 actually implemented. That is, two or more components may be combined into one component as needed, or one component may be divided into two or more components. Also, a function performed in each block is intended to illustrate embodiments, and a specific operation or apparatus does not limit the scope of the present disclosure.

Figure 6:
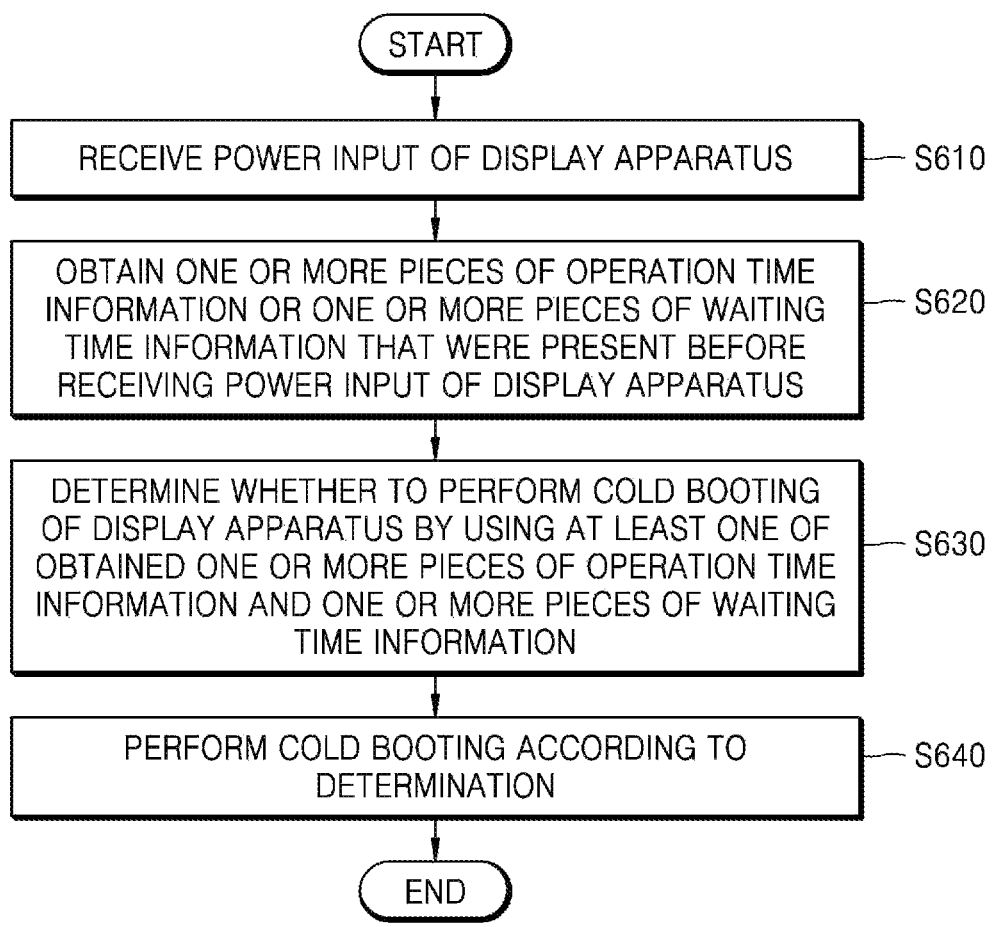
FIG. 6 is a flowchart illustrating a method of operating a display apparatus according to an embodiment.
Figure 7:
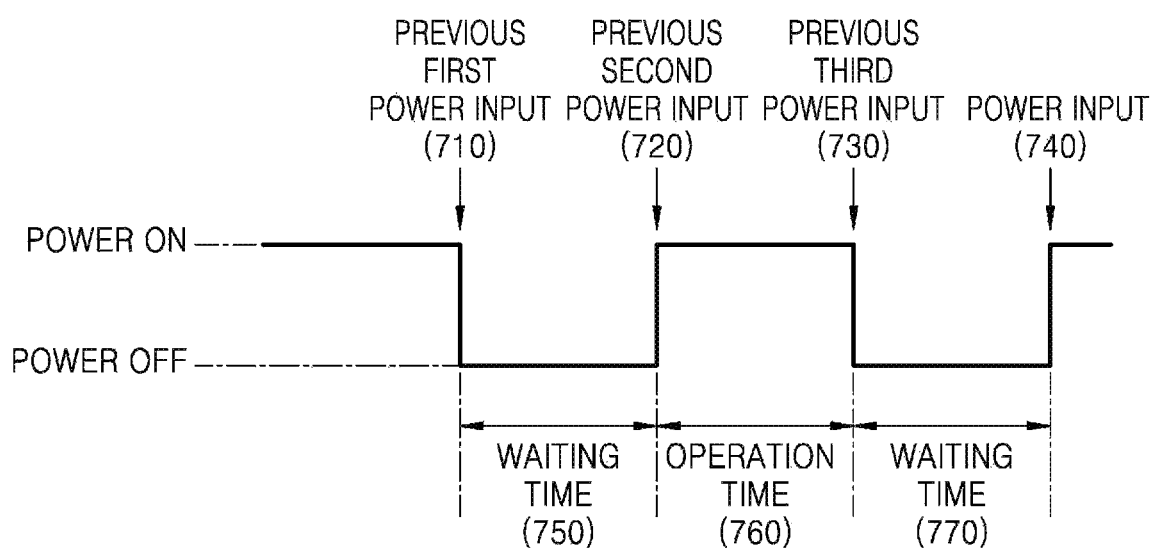
FIG. 7 is a reference diagram for explaining waiting time and operating time before a power input according to an embodiment.

FIG. 6 is a flowchart illustrating a method of operating a display apparatus according to an embodiment. FIG. 7 is a reference diagram for explaining waiting time and operating time before a power input according to an embodiment.

In operation S610, the display apparatus may receive a power input.

The power input may be either an input indicative of power on of the display apparatus or an input indicative of power off of the display apparatus.

In operation S620, in response to receiving the power input, the display apparatus may obtain one or more pieces of operation time information of the display apparatus or one or more pieces of waiting time information of the display apparatus.

The operation time information may indicate a time from when the display apparatus is powered on to when the display apparatus is powered off and indicate a time in a state in which the display apparatus is turned on. The waiting time information may indicate a time from when the display apparatus is powered off to when the display apparatus is powered on again and may indicate a time in a state in which the display apparatus is turned off. That is, the operation time or the waiting time may indicate the time from a point when a certain power input is received to a point when a next power input is received.

Referring to FIG. 7, when a power input received in operation S610 is a current power input 740, a previous first power input 710, a previous second power input 720, and a previous third power input 730 were detected and information thereof stored before receiving the current power input 740. A time between the previous first power input 710 and the previous second power input 720 may represent a waiting time 750. A time between the previous second power input 720 and the previous third power input 730 may represent an operation time 760. A time between the previous third power input 730 and the current power input 740 may represent a waiting time 770.

Upon receiving the current power input 740, a display apparatus may obtain the one or more operation time 760 of the display apparatus or the one or more waiting time 750 and 770 of the display apparatus that that have occurred in the past before receiving the current power input 740.

The quantity of information to be obtained by the display apparatus among operation time information and waiting time information that have been stored before the display apparatus receives the current power input 740 may be appropriately considered according to the policy of the display apparatus. For example, the display apparatus may use only information on the waiting time 770 before receiving the current power input 740, or may use the information on the operation time 760 and the information on the waiting time 770, or both the information on the waiting time 750 and 770 and the information on the operation time 760 or may use operation time information or waiting time information previous to the information on the waiting time 750 and 770 and the information on the operation time 760.

Returning to FIG. 6, in operation S630, the display apparatus may determine whether to perform cold-booting by using at least one of the obtained one or more pieces of operation time information and one or more pieces of waiting time information.

The display apparatus may determine whether to perform cold-booting by determining whether the obtained operation time information/waiting time information corresponds to a predetermined pattern. That is, when the obtained operation time information/waiting time information corresponds to the predetermined pattern, the display apparatus may determine to perform cold-booting, in which power to the volatile memory is discontinued, and when the obtained operation time information/waiting time information does not correspond to the predetermined pattern, may determine not to perform cold-booting.

According to an example, the operation time information/waiting time information corresponds to the predetermined pattern, which means that the operation time/waiting time is less than a predetermined threshold value. That is, when an operation time or a waiting time that was present before the current power input is less than a certain threshold value, it is predicted that the user may not normally use the display apparatus but may repeat turning off and turning on the display in a short period of time due to an error that has occurred in the display apparatus, and thus it is determined that the error has occurred in the display apparatus, for example due to an erroneously executing application.

The predetermined pattern may be determined according to the quantity of operation time information/waiting time information to be compared. Also, the threshold value used in the predetermined pattern may be variously determined or updated by a manufacturer of the display apparatus, a user of the display apparatus, or by machine learning.

In operation S640, the display apparatus may perform cold-booting according to the determination.

The display apparatus may perform cold-booting according to the determination in operation S630. In this regard, because the display apparatus remove content of the volatile memory by cold (hard) power off of the display apparatus, software or application in which an error is likely to occur in the volatile memory of the display apparatus may no longer be stored in the volatile memory.

FIG. 8 is a reference diagram for explaining various user patterns recognized to determine whether cold-booting is required when a display apparatus receives a power key input according to embodiments.

Referring to FIG. 8, 810 indicates a time T1 between a first power input indicating power off and a second power input indicating power on in a power on state of the display apparatus, a time T2 between the second power input indicating power on and a third power input indicating power off, and a time T3 between the third power input indicating power off and a fourth power input indicating power on. In 710, T1 may denote a waiting time from power off of the display apparatus to a next power on, T2 may denote a use time from power on of the display apparatus to a next power off, and T3 may denote a waiting time from power off of the display apparatus and a next power on.

According to an example, the times T1 and T2 may be measured as follows.

In a display apparatus such as a TV, there is a microcomputer always waiting to receive a remote control input even during the TV off operation. When the TV is turned off, the microcomputer may count the TV off time by using internal time information or an internal counter. Then, when the TV is powered on, a module checking a waiting time after power off through the microcomputer may request and receive the waiting time from the microcomputer, thereby calculating the time T1. Also, when an operation of turning off a panel only and not turning off a main CPU during the TV off operation is added, the time T1 may be calculated by including such an operation in the time T1. Because the CPU operates after the TV is turned on from the off state, the time T2 during which the TV is turned on may be calculated using time information provided by an OS without the help of the microcomputer.

In 810 of FIG. 8, the first power input is an input indicative of power off in the power on state of the display apparatus. However, as in 820 of FIG. 8, the first power input may be an input indicative of power on in the power off state of the display apparatus. For example, although a system error occurs in the TV on state, the user may not have a power off input for error recovery but the TV may be in a power off state. In this case, when the user later performs a power on input, because the TV may be still in an error state, the TV may need to recover the error in this situation.

In FIG. 8, 820 indicates the time T1 between a first power input indicating power on and a second power input indicating power off in a power off state of the display apparatus, the time T2 between the second power input indicating power off and a third power input indicating power on, and the time T3 between the third power input indicating power on and a fourth power input indicating power off. In 720, T1 may denote a use time from power on of the display apparatus to a next power off, T2 may denote a waiting time from power off of the display apparatus to a next power on, and T3 may denote a use time from power on of the display apparatus and a next power off.

The display apparatus may determine whether cold-booting of the display apparatus is necessary by using one or a combination of one or more of the time information T1, T2, and T3.

According to an embodiment, the display apparatus may determine whether the time information T1 corresponds to a predetermined first pattern to determine whether rebooting of the display apparatus is necessary.

According to an embodiment, the display apparatus may determine whether the time information T2 corresponds to a predetermined second pattern to determine whether cold-booting of the display apparatus is necessary.

According to an embodiment, the display apparatus may determine whether the time information T3 corresponds to a predetermined third pattern to determine whether cold-booting of the display apparatus is necessary.

According to an embodiment, the display apparatus may determine whether the time information T1 and the time information T2 correspond to the predetermined first pattern and the predetermined second pattern, respectively, to determine whether cold-booting of the display apparatus is necessary.

According to an embodiment, the display apparatus may determine whether the time information T1 corresponds to the predetermined first pattern or whether the time information T2 corresponds to the predetermined second pattern to determine whether cold-booting of the display apparatus is necessary.

According to an embodiment, the display apparatus may determine whether the time information T2 and the time information T3 correspond to the predetermined second pattern and a predetermined third pattern, respectively, to determine whether cold-booting of the display apparatus is necessary.

According to an embodiment, the display apparatus may determine whether the time information T2 corresponds to the predetermined second pattern or whether the time information T3 corresponds to the predetermined third pattern to determine whether cold-booting of the display apparatus is necessary.

According to an embodiment, the display apparatus may determine whether the time information T1, T2, and T3 corresponds to the predetermined first pattern, the predetermined second pattern, and the predetermined third pattern, respectively, to determine whether cold-booting of the display apparatus is necessary.

According to an embodiment, the first pattern, the second pattern, and the third pattern may be determined experimentally and set in a display apparatus product in advance.

According to an embodiment, the first pattern, the second pattern, and the third pattern set in the display apparatus may be updated by a user selection, or may be updated by receiving an update value through a server.

According to an embodiment, the first pattern, the second pattern, and the third pattern set in the display apparatus may be updated by the display apparatus analyzing and learning the behavior pattern of the user. In an example, the first pattern, the second pattern, and the third pattern may be updated by artificial intelligence (AI) based machine learning. An AI system is a computer system with human level intelligence. Also, unlike an existing rule based smart system, the AI system is a system that trains by itself, decides, and becomes increasingly smarter. According to use of the AI system, because the recognition rate of the AI system may improve and thus the AI system may more accurately understand a user preference, an existing rule based smart system has been gradually replaced by a deep learning based AI system. AI technology refers to machine learning (deep learning) and element technologies that utilize the machine learning. Machine learning is an algorithm technology that classifies/learns the features of input data by itself. Element technology is a technology that simulates functions of the human brain, such as recognition and judgment, by using machine learning algorithms and consists of technical fields such as linguistic understanding, visual comprehension, reasoning/prediction, knowledge representation, and motion control.

Figure 9:
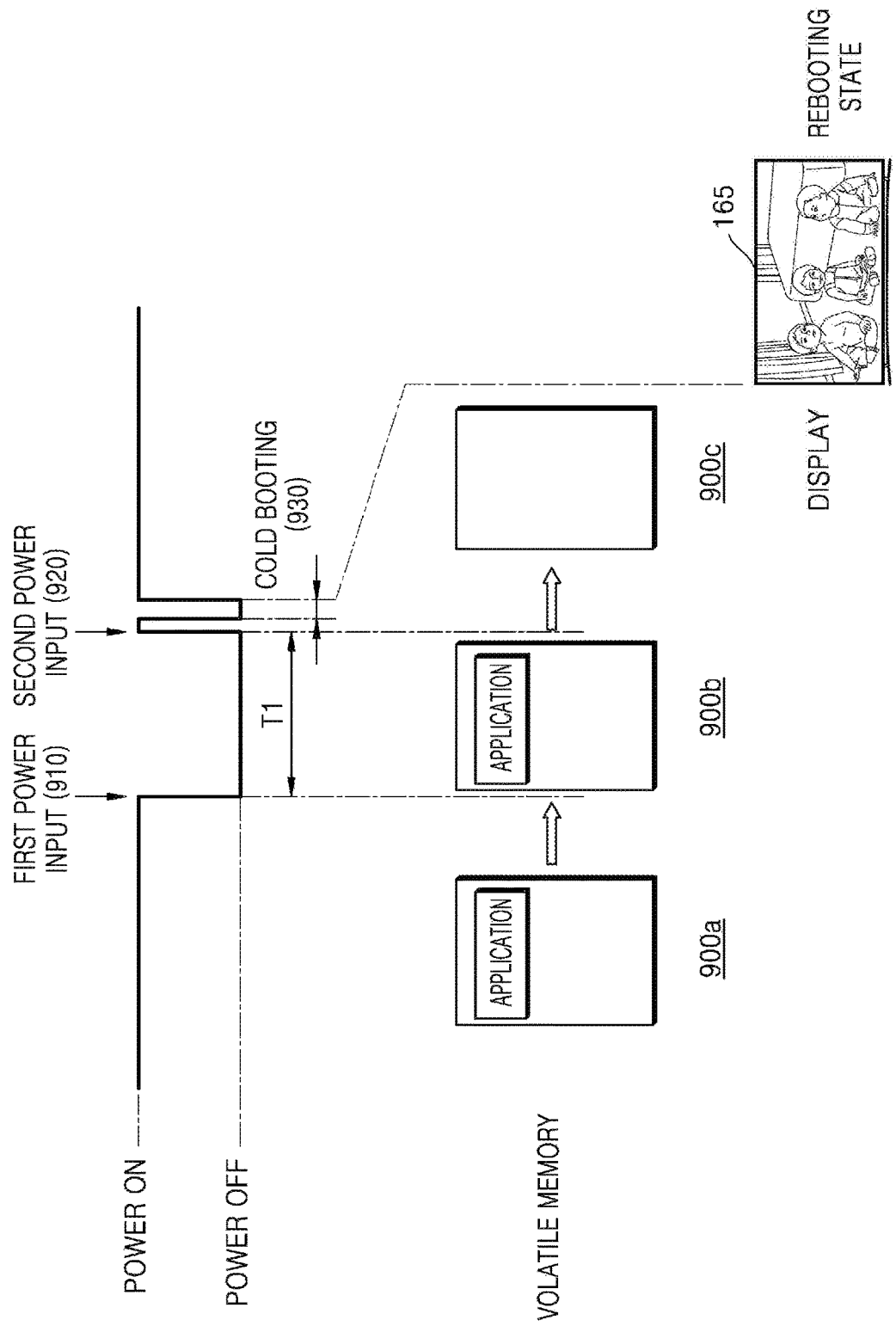
FIG. 9 shows an example in which a display apparatus uses time information to determine whether cold-booting is required according to an embodiment.

FIG. 9 shows an example in which a display apparatus uses the time information to determine whether cold-booting is required according to an embodiment.

Referring to FIG. 9, in a power on state of the display apparatus, the display apparatus may have one or more applications loaded in a volatile memory by the processor or controller executing one or more applications. The one or more applications loaded in the volatile memory may be in an error state (900a).

Upon receiving a first power input for power off in the power on state of the display apparatus, the display apparatus may perform power off. At this time, even when the display apparatus to which a suspend to RAM function is applied receives the first power input indicating power off, because content of the volatile memory is maintained, the one or more erroneously executing applications stored in the volatile memory during power off of the display apparatus may be maintained (900b). Thereafter, upon receiving a second power input for power on of the display apparatus, the display apparatus may perform a booting operation in response to receiving the second power input for power on of the display apparatus.

Then, the display apparatus according to an embodiment may confirm the time T1 from the first power input to the second power input and determine whether to perform cold-booting (930) according to whether T1 corresponds to a first predetermined pattern.

When the T1 does not correspond to the first predetermined pattern, for example, when T1 is greater than a predetermined first threshold value, the display apparatus predicts that there is no problem in display apparatus. Thus, the display apparatus determines not to perform any additional operation based on the T1, and normally performs operations, such as waiting to receive some user input and performing operation corresponding to the user input.

When the T1 corresponds to the first predetermined pattern, the display apparatus may determine cold-booting of the display apparatus. For example, the display apparatus may determine cold-booting of the display apparatus when T1 is less than or equal to a predetermined first threshold value, that is, when it is determined that a waiting time of the display apparatus is less than or equal to the predetermined threshold value. In other words, a short waiting time of the display apparatus predicts that a user does not normally use a display apparatus but finds an error in the operation of the display apparatus and performs an operation of turning off and on the display apparatus for error recovery.

The display apparatus may be cold powered off to perform cold-booting. In this case, power supply of the volatile memory may be also stopped to reset the volatile memory, thereby completely removing the content of the volatile memory (900c). As described above, the display apparatus may remove one or more applications in which an error is likely to occur from the volatile memory by performing cold-booting in which power to the volatile memory is discontinued.

The display apparatus that performed cold-booting 930 may display a broadcast signal according to a normal TV mode on a display 165. That is, because the one or more applications previously stored in the volatile memory are removed by rebooting 930, the display apparatus may display a normal broadcast signal instead of displaying a previously executed application in which an error is likely to occur after performing cold-booting.

Figure 10:
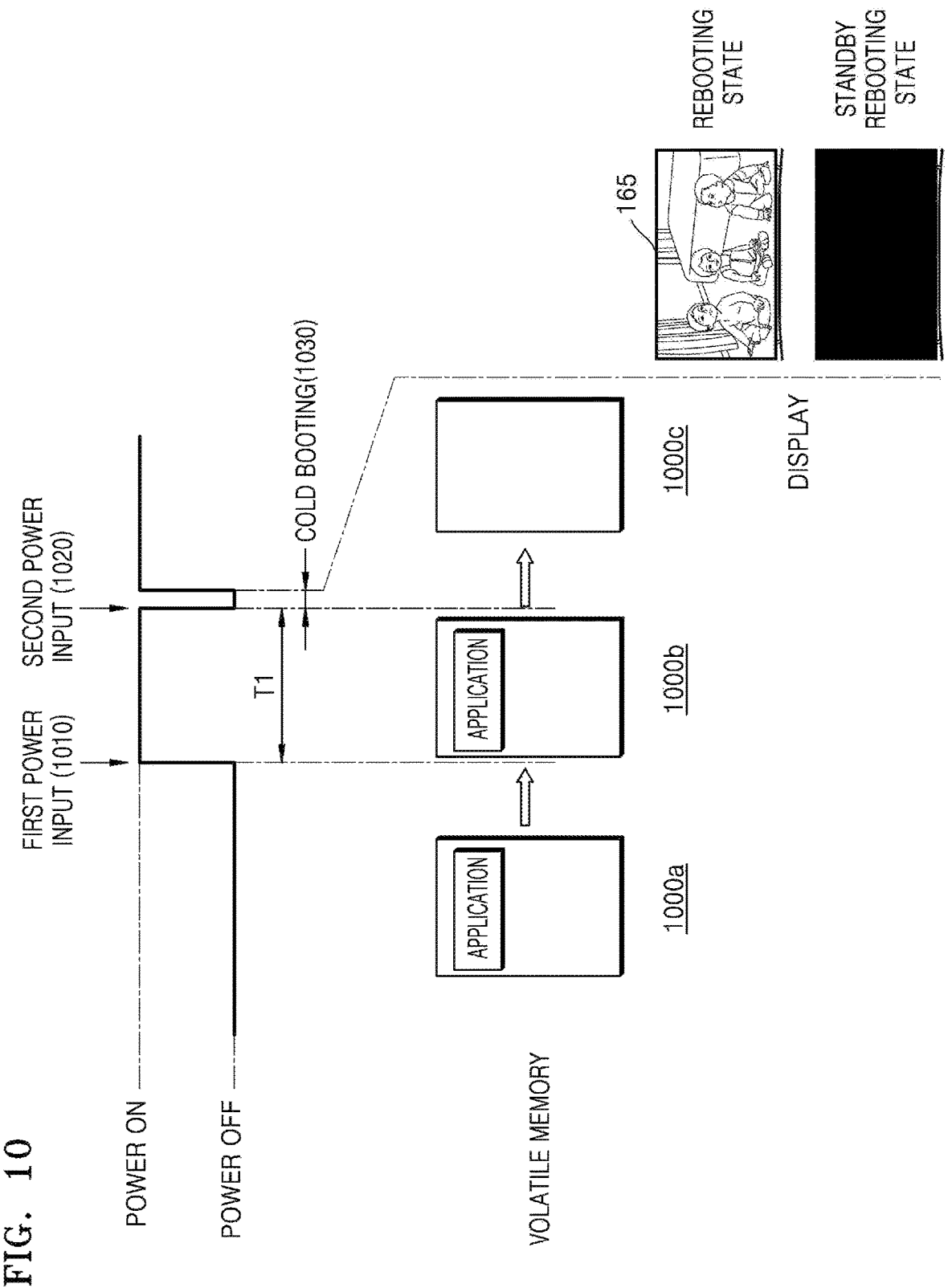
FIG. 10 shows an example in which a display apparatus uses time information to determine whether cold-booting is required according to an embodiment.

FIG. 10 shows an example in which a display apparatus uses the time information to determine whether cold-booting is required according to an embodiment.

Referring to FIG. 10, in a power off state of the display apparatus, the display apparatus may have one or more applications stored in a volatile memory. The one or more applications stored in the volatile memory may be in an error state (1000a). For example, when an error occurs while using a previous display apparatus but a user turns off the display apparatus without taking any action for error recovery, the display apparatus may still maintain an error state of the application.

Upon receiving a first power input 1010 for power on in the power off state of the display apparatus, the display apparatus may perform power on. At this time, the display apparatus to which a suspend to RAM function is applied may display application execution image on a display by using the one or more applications maintained in the volatile memory according to a power on command (1000b). Thereafter, upon receiving a second power input 1020 indicating power off of the display apparatus, the display apparatus may perform power off.

At this time, the display apparatus according to an embodiment may confirm the time T1 from the first power input to the second power input according to receiving the second power input 1020 and determine whether to perform cold-rebooting according to whether T1 corresponds to a predetermined first pattern (1030).

When the T1 does not correspond to the first predetermined pattern, for example, when T1 is greater than a predetermined first threshold value, the display apparatus predicts that there is no problem in display apparatus. Thus, the display apparatus determines not to perform cold-booting, and performs power off according to the second power input 1020 indicating power off the display apparatus.

When the T1 corresponds to the first predetermined pattern, the display apparatus may determine cold-booting of the display apparatus. For example, the display apparatus may determine rebooting of the display apparatus when T1 is less than or equal to a predetermined first threshold value, that is, when it is determined that a use time of the display apparatus is less than or equal to the predetermined first threshold value. In other words, a short use time of the display apparatus predicts that a user does not normally use a display apparatus but finds an error in the operation of the display apparatus and performs an operation of turning off and on the display apparatus for error recovery.

The display apparatus may be powered off to perform cold-booting. In this case, power supply of the volatile memory may be also stopped to initialize the volatile memory, thereby completely removing the content of the volatile memory (1000c). As described above, the display apparatus may remove one or more applications in which an error is likely to occur from the volatile memory by performing cold-booting.

The display apparatus that performed cold-booting 1030 may display a broadcast signal according to a normal TV mode on the display 165. That is, because the one or more applications previously stored in the volatile memory are removed by rebooting 1030, in which power to the memory is discontinued, the display apparatus may display a normal broadcast signal instead of displaying a previously executed application in which an error is likely to occur after performing rebooting.

Alternatively, the display apparatus that performed cold-booting 1030 according to another embodiment may maintain a standby rebooting state. Standby rebooting is the same as a rebooting state of the display apparatus, but only the display of the display apparatus is turned off. Thus, the display apparatus in the standby rebooting state may quickly operate upon receipt of a user input because only the display is turned off and other components such as a processor or volatile memory are turned on.

Figure 11:
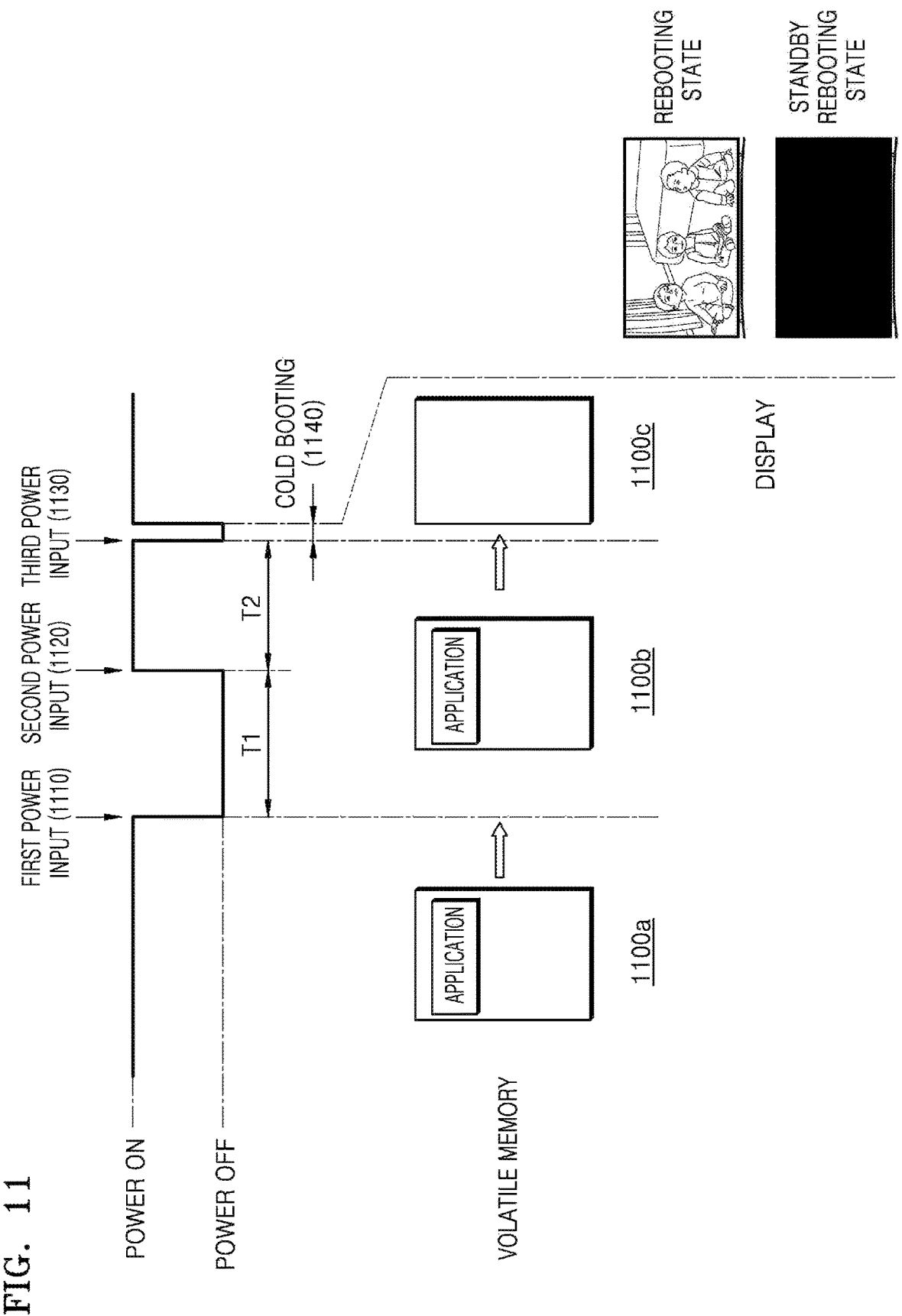
FIG. 11 shows an example in which a display apparatus uses time information to determine whether cold-booting is required according to an embodiment.

FIG. 11 shows an example in which a display apparatus uses multiple time information to determine whether cold-booting is required according to an embodiment.

Referring to FIG. 11, in a power on state of the display apparatus, the display apparatus may have one or more applications loaded in a volatile memory by executing one or more applications. The one or more applications loaded in the volatile memory may be in an error state (1100*a*).

Upon receiving the first power input 1110 for power off in the power on state of the display apparatus, the display apparatus may perform power off. At this time, even when the display apparatus to which a suspend to ram function is applied receives the first power input indicating power off, because content of the volatile memory is maintained, the one or more erroneously executing applications stored in the volatile memory during power off of the display apparatus may be maintained (1100*b*). Thereafter, upon receiving the second power input 1120 for power on of the display apparatus, the display apparatus may perform power on.

The display apparatus may receive a third power input 1130 after power on of the display apparatus by receiving the second power input 1120.

At this time, the display apparatus according to an embodiment may confirm the time T1 from the first power input 1110 to the second power input 1120 and the time T2 from the second power input 1120 to the third power input 1130, and perform cold-booting 1140 when time T1 and time T2 respectively correspond to predetermined first pattern and the predetermined second pattern.

According to an example, the display apparatus may determine whether to perform cold-booting by determining whether the time information T1 and T2 correspond to the predetermined first pattern and the second pattern, respectively. For example, the display apparatus may determine cold-booting of the display apparatus when T1 is less than or equal to a predetermined first threshold value and T2 is less than or equal to a predetermined second threshold value. That is, when the waiting time T1 of the display apparatus and the use time T2 of the display apparatus after the waiting time T1 are short, it is predicted that a user does not use a normal display apparatus but finds an error in the operation of the display apparatus and performs an operation of turning off and on the display apparatus for error recovery.

According to another example, the display apparatus may determine whether any one of the time information T1 and T2 corresponds to the predetermined first pattern and the second pattern to determine rebooting. For example, the display apparatus may determine rebooting of the display apparatus when T1 satisfies the predetermined first threshold value, T2 satisfies the predetermined second threshold value, or only one of the two conditions is satisfied.

The display apparatus may be powered off to perform cold-booting. In this case, power supply of the volatile memory may be also stopped to reset the volatile memory, thereby completely removing the content of the volatile memory (1100*c*). As described above, the display apparatus may remove one or more erroneous applications in which an error is likely to occur from the volatile memory by performing rebooting in which power to the memory is discontinued.

The display apparatus that performed cold-booting 1140 may display a broadcast signal according to a normal TV mode on the display 165. That is, because the one or more applications previously stored in the volatile memory are removed by cold-booting 1140, the display apparatus may display a normal broadcast signal instead of displaying a previously executed application in which an error is likely to occur after performing cold-booting.

Alternatively, the display apparatus that performed cold-booting 1140 according to another embodiment may maintain a standby rebooting state.

In the example shown in FIG. 11, the first power input is received in the power on state of the display apparatus. However, in the case of using T1/T2, the first power input may be received in a power off state of the display apparatus as in FIG. 10.

Figure 12:
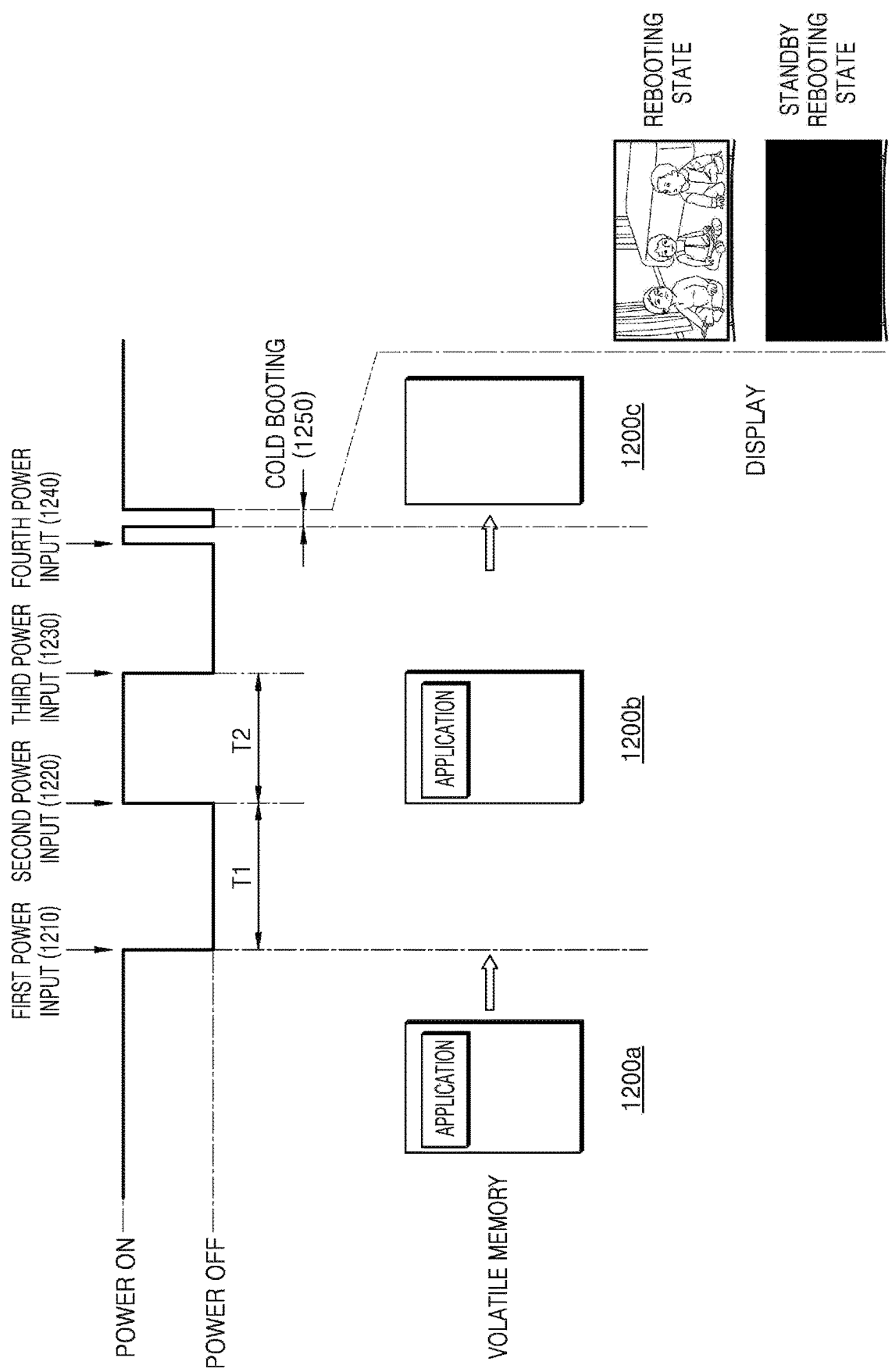
FIG. 12 shows an example in which a display apparatus uses time information to determine whether cold-booting is required according to an embodiment.

FIG. 12 shows an example in which a display apparatus uses multiple time information to determine whether cold-booting is required according to an embodiment. The example shown in FIG. 12 is the same as the example shown in FIG. 11, except for a time for determining cold-booting.

Referring to FIG. 12, in a power on state of the display apparatus, the display apparatus may receive a first power input 1210, a second power input 1220, and a third power input 1230. The display apparatus may be in states 1200*a* and 1200*b* in which one or more applications are stored in a volatile memory until receiving the third power input 1230.

In the example shown in FIG. 11, the display apparatus determines whether to cold-reboot the display apparatus after receiving a third power input, whereas in the example shown in FIG. 12, the display apparatus may determine whether to cold-reboot the display apparatus after receiving (not the third power input 1230) a fourth power input 1240.

At this time, the display apparatus according to an embodiment may confirm the time T1 from the first power input 1210 to the second power input 1220 and the time T2 from the second power input 1220 to the third power input 1230, and may perform cold-booting 1260 when time T1 and time T2 respectively correspond to the predetermined first pattern and the predetermined second pattern. An operation of determining whether to perform rebooting using time T1 and time T2 is the same as that in FIG. 11, and thus a further explanation is omitted.

Figure 13:
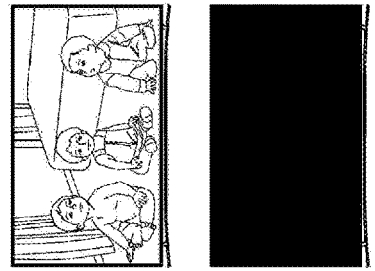
FIG. 13 shows an example in which a display apparatus uses time information to determine whether cold-booting is required according to an embodiment.

FIG. 13 shows an example in which a display apparatus uses the time information to determine whether cold-booting is required according to an embodiment. The example shown in FIG. 13 is the same as the example shown in FIG. 12, except that T1, T2 and T3 are further considered.

Referring to FIG. 13, in a power on state of the display apparatus, the display apparatus may receive a first power input 1310, a second power input 1320, a third power input 1330, and a fourth power input 1340. The display apparatus may be in states 1300*a* and 1300*b* in which one or more applications are maintained in a volatile memory during rebooting until receiving the fourth power input 1340.

Upon receiving the fourth power input 1340, the display apparatus according to an embodiment may confirm the time T1 from the first power input 1310 to the second power input 1320, the time T2 from the second power input 1320 to the third power input 1330, and the time T3 from the third power input 1330 to the fourth power input 1340, and may perform cold-booting 1350 when time T1, time T2, and time T3 correspond to predetermined first pattern, second pattern, and third pattern respectively.

According to an example, the display apparatus may determine cold-booting by determining whether the time information T1, T2, and T3 correspond to the predetermined first pattern, second pattern, and third pattern, respectively.

According to another example, the display apparatus may determine cold-booting by determining whether one or more combinations of the time information T1, T2, and T3 correspond to the first pattern, the second pattern, and the third pattern respectively.

The display apparatus that performed cold-booting 1350 may display a broadcast signal according to a normal TV mode on the display 165. That is, because the one or more applications previously stored in the volatile memory are removed by cold-booting 1350, in which power to the volatile memory is discontinued, the display apparatus may display a normal broadcast signal instead of displaying a previously executed application in which an error is likely to occur after performing cold-booting.

Alternatively, the display apparatus that performed cold-booting 1350 according to another embodiment may maintain a standby rebooting state.

Hereinafter, examples of applying the embodiments to a display apparatus to which switching between an information mode and a normal is applied will be described with reference to FIGS. 14 to 16.

In a normal display apparatus, power on of the display apparatus and power off of the display apparatus are toggled according to a power input button. Accordingly, when the power input button is pressed in a power on state of the display apparatus, the display apparatus may be powered off, and when the power input button is pressed again in a power off state of the display apparatus, the display apparatus may be powered on.

In the display apparatus to which the "information mode/normal mode switching function" is applied, power on/off of the display apparatus may not be toggled according to the power input button, but an information mode/normal mode of the display apparatus may be switched. That is, when the power input button is pressed in the normal mode, in which a display apparatus is normally used, the normal mode may be switched to the information mode of the display apparatus by executing a predetermined application or widget set to be executed in response to a power input. In the information mode, the display apparatus may display information such as weather or display an image such as a gallery or the like. When the power input button is pressed in the information mode of the display apparatus, the display apparatus may be switched to the normal mode. In the normal mode, an application displaying broadcast content may be executed to display the broadcast content. When the power input is again received during execution of the application displaying the broadcast content in the normal mode, execution of the application displaying the broadcast content may be suspended and the predetermined application or widget set to be executed in response to the power input may be executed.

When the information mode/normal mode switching function is applied to the display apparatus, because the display apparatus is not turned off according to the power input button, it may be difficult to recover normal operations when there is an erroneous application in the display apparatus.

Figure 14:
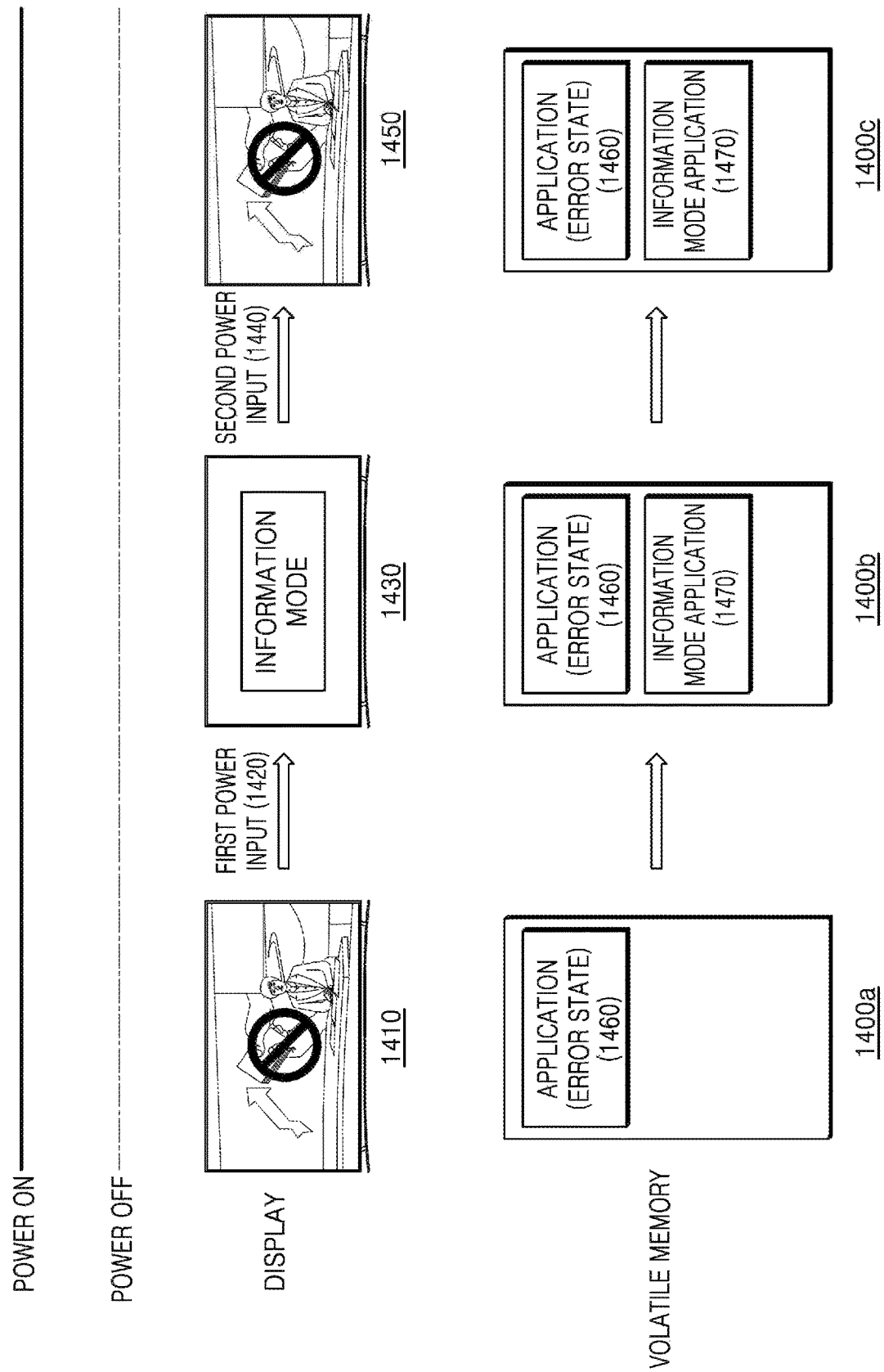
FIG. 14 is a reference diagram for explaining an operation in a display apparatus to which a mode switching function is applied according to a power input.

FIG. 14 is a reference diagram for explaining an operation in a display apparatus to which an information mode/normal mode switching function is applied according to a power input.

Referring to FIG. 14, the display apparatus may display a broadcast signal or may execute one or more applications in a normal mode 1410 of the display apparatus. Also, an error may occur in the one or more applications while the display apparatus is executing the one or more applications. Thus, a volatile memory may be in a state 1400a in which erroneous one or more applications 1460 are stored and the one or more applications may also be displayed in an error state on a display of the display apparatus.

At this time, a user may press the first power input button to recover the error state and the display apparatus may receive a first power input 1420. In response to receiving the first power input 1420, the display apparatus may switch a display mode from the normal mode 1410 to an information mode 1430. That is, the display apparatus may load one or more applications 1470 corresponding to the information mode 1430 into the volatile memory and execute an application corresponding to the loaded information mode 1430 to display application execution image on the display. The volatile memory may be a state 1400b in which the erroneous one or more applications 1460 and the one or more applications 1470 corresponding to the information mode 1430 are stored.

When the user again presses a second power input button, the display apparatus may receive a second power input 1440 and the display apparatus may switch the display mode from the information mode 1430 to a normal mode 1450. That is, the display apparatus may display and execute the one or more applications 1460 executed in a broadcast display mode prior to the information mode 1430 in a state 1400c of the volatile memory. However, because the one or more applications 1460 executed in the previous normal mode 1410 are in the error state, the display apparatus may still be forced to display erroneous applications.

Because the display apparatus to which the information mode/normal mode switching function is applied is not turned off even by a power input, it is not easy to recover such an error even when an error occurs in an application executed in the display apparatus.

Figure 15:
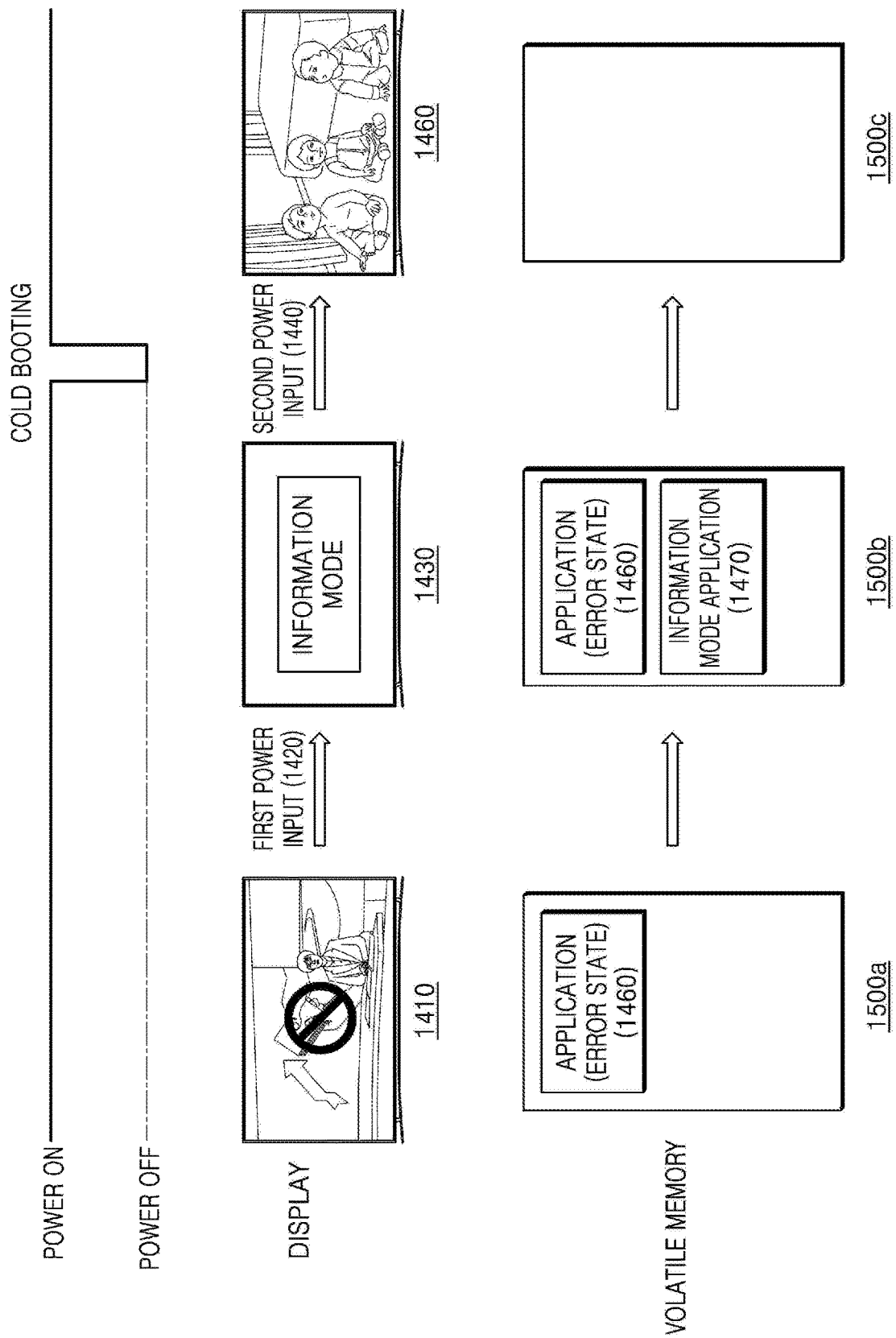
FIG. 15 is a reference diagram for explaining an operation of a display apparatus to which a mode switching function is applied according to an embodiment.

FIG. 15 is a reference diagram for explaining an operation of a display apparatus to which an information mode/normal mode switching function is applied according to an embodiment.

Referring to FIG. 15, the operation of the display apparatus shown in FIG. 15 is the same as an example shown in FIG. 14 before the second power input 1440 is received.

When the display apparatus in an information mode state receives the second power input 1440, the display apparatus may confirm a time from the first power input 1420 to the second power input 1440, i.e., a time during which the display apparatus is in the information mode, and when the time corresponds to a predetermined first pattern, may determine cold-booting of the display apparatus.

That is, when the time for which the display apparatus maintains the information mode of the display apparatus is shorter than, for example, a first threshold time, it may be predicted that a user does not normally use the display apparatus but an error occurs in the display apparatus due to any cause. Thus, the display apparatus may determine rebooting of the display apparatus when the time from the first power input 1420 to the second power input 1440 corresponds to the predetermined first pattern because the first power input 1420 is received. According to determination of cold-booting, the display apparatus may cold power off the display apparatus and may reboot the display apparatus, including discontinuing power to the volatile memory. Content stored in a volatile memory of the display apparatus may be completely removed by the display apparatus that is powered off such that the volatile memory of the display apparatus may be in a newly initialized state 1500c after cold-booting. Accordingly, because the erroneous application 1460 stored in the volatile memory is erased, the display apparatus may receive and display 1460 a predetermined broadcasting signal after rebooting.

Figure 16:
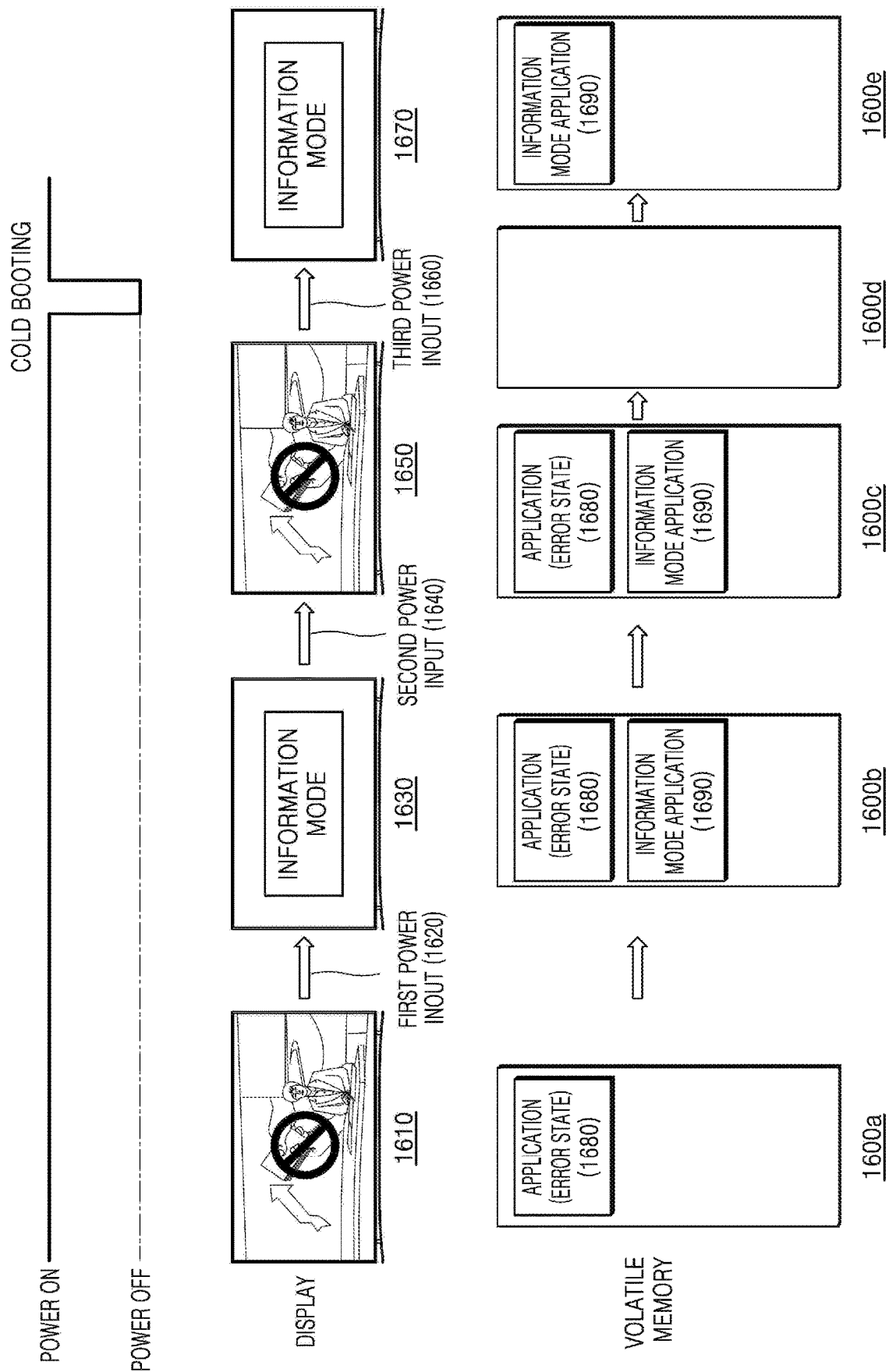
FIG. 16 is a reference diagram for explaining an operation of a display apparatus to which a mode switching function is applied according to an embodiment.

FIG. 16 is a reference diagram for explaining an operation of a display apparatus to which an information mode/normal mode switching function is applied according to an embodiment.

In an example shown in FIG. 15, only T1 is used when determining whether to cold-reboot the display apparatus, but T1 and T2 are considered when determining whether to cold-reboot the display apparatus in an example shown in FIG. 16.

Referring to FIG. 16, the display apparatus may display a broadcast signal or may execute one or more applications in a normal mode 1610 of the display apparatus. Also, an error may occur in the one or more applications while the display apparatus is executing the one or more applications. Thus, a volatile memory may be in a state 1600a in which erroneous one or more applications 1680 are stored, and one or more applications may also be displayed in an error state on a display of the display apparatus.

At this time, a user may press a first power input button to recover the error state and the display apparatus may receive a first power input 1620. In response to receiving the first power input 1620, the display apparatus may switch a display mode from the normal mode 1610 to an information mode 1630. That is, the display apparatus may load one or more applications 1690 corresponding to the information mode 1630 into the volatile memory and execute an application corresponding to the loaded information mode 1630 to display application execution image on the display. The volatile memory may be in a state 1600b in which the erroneous one or more applications 1680 and the one or more applications 1690 corresponding to the information mode 1630 are stored.

When the user again presses a second power input button, the display apparatus may receive a second power input 1640 and the display apparatus may switch the display mode from the information mode 1630 to a normal mode 1650. That is, the display apparatus may display and execute the one or more applications 1680 executed in the normal mode 1610 prior to the information mode 1630 in a state 1600c of the volatile memory. However, because the one or more applications 1680 executed in the previous normal mode 1610 are in the error state, the display apparatus may be still forced to display erroneous applications.

When the display apparatus in a normal mode state receives a third power input 1660, the display apparatus may confirm a time from the first power input 1620 to the second power input 1640, i.e., the time T1 during when the display apparatus is in the information mode 1630 and a time from the second power input 1640 to the third power input 1660, that is, the time T2 during when the display apparatus is in the normal mode 1650, determine whether the time information T1 and the time information T2 respectively correspond to a predetermined first pattern and a predetermined second pattern, and according to a result of determination, determine cold-booting of the display apparatus. A method of determining whether the time information T1/T2 correspond to the predetermined first pattern/second patterns may be variously determined as described with reference to FIG. 11.

That is, when the time T1 for which the display apparatus maintains the information mode 1630 of the display apparatus and the time T2 for which the display apparatus maintains the normal mode 1650 are shorter than a first threshold time/a second threshold time respectively, it may be predicted that a user does not normally use the display apparatus but an error occurs in the display apparatus due to any cause. Thus, the display apparatus may determine cold-booting of the display apparatus to clear contents of the volatile memory. According to determination of cold-booting, the display apparatus may cold power off the display apparatus and may reboot the display apparatus. Content stored in a volatile memory of the display apparatus may be completely removed by the display apparatus that is powered off such that the volatile memory of the display apparatus may be in a newly initialized state 1600d after cold-booting. Accordingly, because the erroneous application 1680 stored in the volatile memory and the one or more applications 1690 are erased, the display apparatus may load 1600e the one or more applications 1690 into the volatile memory again after cold-booting and display 1670 the one or more applications 1690 on the display.

Figure 17:
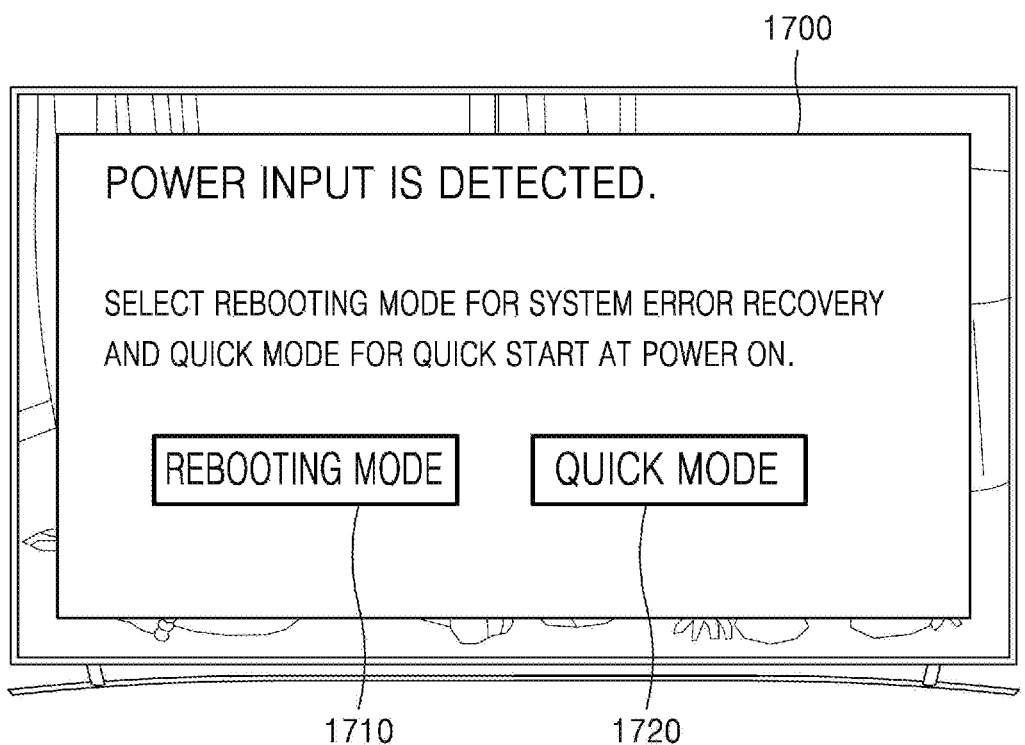
FIG. 17 illustrates an example of a user interface that may be displayed on a display when a display apparatus detects a power input according to an embodiment.

FIG. 17 illustrates an example of a user interface 1700 that may be displayed on a display when a display apparatus detects a power input according to an embodiment.

When the display apparatus detects the power input, determines whether to cold-reboot the display apparatus, and determines to perform a cold-booting operation of the display apparatus, the display apparatus may output the user interface 1700 as shown in FIG. 17 before starting the cold-booting operation and inquire whether a user wishes the rebooting operation.

Referring to FIG. 17, the user interface 1700 displayed on the display apparatus may include <A power input is detected. Select a rebooting mode for system error recovery and a quick mode for quick start at power on>, and also include a rebooting mode item 1710 and a quick mode item 1720. In response to the selection of the rebooting mode item 1710, the display apparatus may remove content of a volatile memory by performing the cold-booting operation of the display apparatus, and in response to the selection of the quick mode item 1720, may perform power off while maintaining power supply of the volatile memory according to a suspend to RAM function.

According to embodiments, the display apparatus may determine whether cold-booting of the display apparatus is necessary by using a waiting time or a length of an operation time before the power input. However, although the display apparatus determines to reboot the display apparatus because of a short waiting time or operating time due to some cause before the power input, an error of the display apparatus may not actually occur but the waiting time or the operation time may be short due to a problem of user manipulation. In view of this situation, the display apparatus may prevent the user from starting an unwanted cold-booting operation by outputting the user interface 1700 as shown in FIG. 17 and confirming the intention to the user before starting actual cold-booting.

Figure 18:
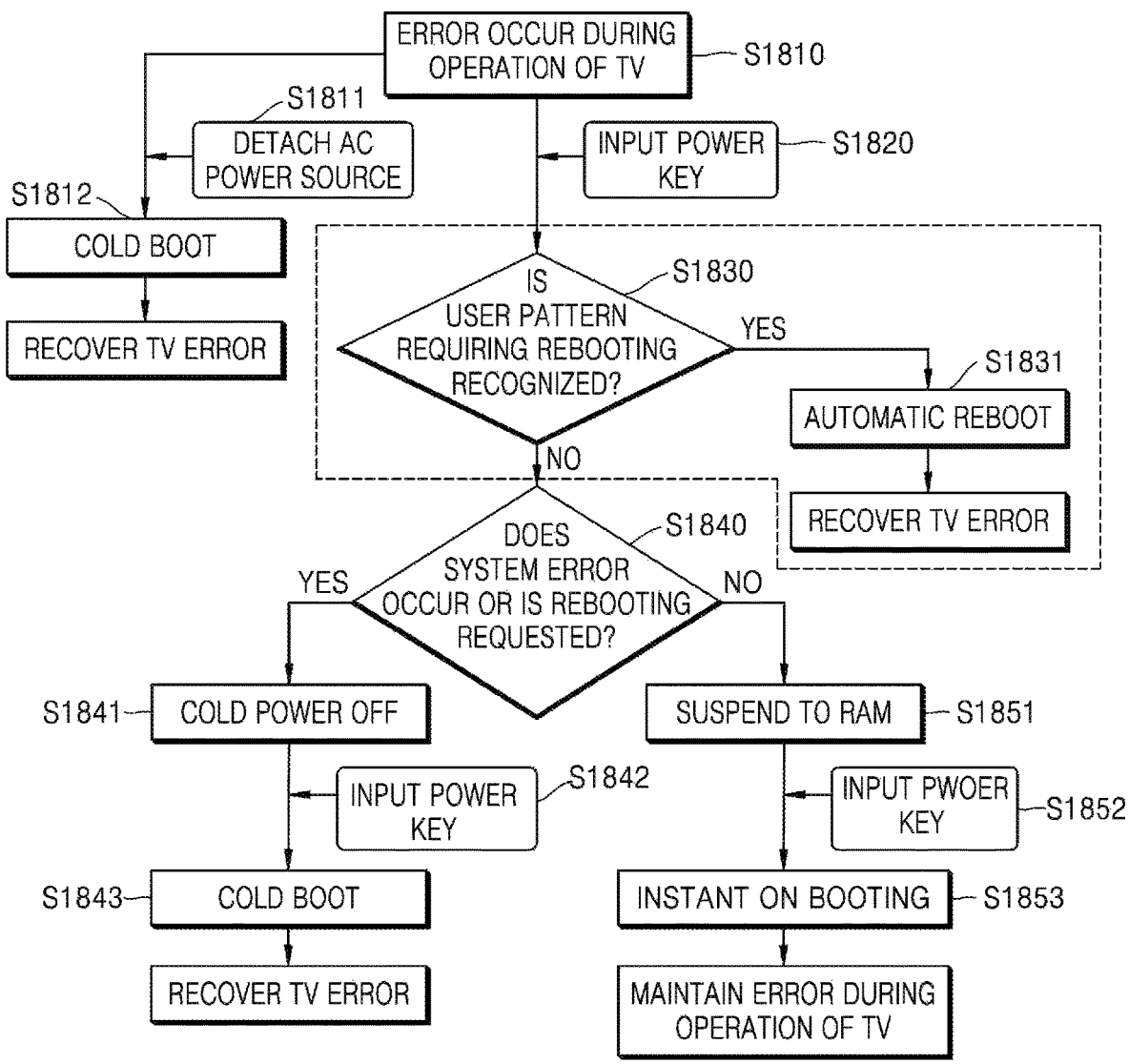
FIG. 18 is a flowchart illustrating a method of operating a display apparatus according to an embodiment.

FIG. 18 is a flowchart illustrating a method of operating a display apparatus according to an embodiment.

Referring to FIG. 18, in operation S1810, an error may occur during an operation of the display apparatus. For example, an application being executed by the display apparatus may enter an erroneous state.

In operation S1811, a user may detach an AC power source for error recovery of the display apparatus.

In operation S1812, detachment of the AC power source may cause cold (hard) booting or reset of the display apparatus.

Booting is starting up the display apparatus to an initial state that it may be used. When the display apparatus is turned on, the system is subjected to a power on self test, and then the operating system is read into RAM which is the volatile memory. When an operating system program is loaded into the RAM without any abnormality, the display apparatus enters a state to accept a user command, which indicates that the display apparatus is booted. Booting by a power switch or reset is referred to as cold (hard) booting. Because content of the volatile memory of the display apparatus is completely removed by cold booting, errors of applications or software stored in the volatile memory may be eliminated. Thus, the error of the display apparatus may be recovered.

In operation S1820, when an error occurs during the operation of the display apparatus, the user may input a power key. For example, the display apparatus may receive a power off input through a user input provided on the display apparatus, or may receive a power-off input from a remote control device via a communicator 180 or a sensor 185.

In operation S1830, when a power key input is received, the display apparatus may recognize a user pattern to determine whether cold-booting of the display apparatus is required. Generally, when the error occurs during operation of the display apparatus, the user often inputs the power key of the display apparatus within a predetermined time, for example, a few seconds. For example, when a time between a first power input and a second power input is short, it may be predicted that there is a high probability that the user presses the power key due to the error occurred in the display apparatus. Therefore, the display apparatus according to embodiments may by set a pattern having a high possibility that an error has occurred in the display apparatus and determine whether an operation in an actual display apparatus corresponds to the set pattern.

The pattern having the high possibility that the error has occurred in the display apparatus may be variously determined. Various patterns are as described in FIG. 7.

When it is determined in operation S1830 that cold-booting of the display apparatus is not necessary as a result of recognizing the user pattern, the display apparatus may proceed to operation S1840.

In operation S1840, the display apparatus may determine whether a system error has occurred.

To determine the system stability, the display apparatus 100 may confirm whether an executing application is normally operating, a system internal memory is normally operating, a system driver is malfunctioning, a crash occurs between running applications, whether rebooting is necessary because of a software update, etc. For example, the display apparatus 100 may use a specific memory or a specific part of memory during the operation of the display apparatus 100 to store values related to the system stability. That is, the display apparatus 100 may store a value indicating whether the running application is normally operating, a value indicating whether the system driver is malfunctioning, a value indicating whether the crash occurs between running applications, a value indicating whether rebooting is necessary because of the software update, etc. in the specific memory or the specific part of the memory. The display apparatus 100 may determine the system stability by reading the stored values related to the system stability.

In operation S1841, the display apparatus 100 may enter a cold power off mode in response to a system instability state as a result of determining the system stability.

In operation S1842, the display apparatus 100 may receive the power key input.

In operation S1843, the display apparatus 100 may perform cold booting. Because an error code stored in the volatile memory of the display apparatus 100 is removed by performing cold power off and cold booting, an error of the display apparatus may be recovered.

In operation S1851, the display apparatus 100 may enter a suspend to RAM mode in response to determination that the system is stable as a result of determining the system stability.

In operation S1852, the display apparatus may receive the power key input.

In operation S1853, because the display apparatus is in the suspend to RAM mode, the display apparatus may perform instant on booting in response to the power key input.

In operation S1830, when the display apparatus determines that cold-booting of the display apparatus is necessary as a result of recognizing the user pattern, the display apparatus may proceed to operation S1831.

In operation S1831, the display apparatus may perform cold-booting. By this cold-booting, the error of the display apparatus may be recovered.

The process of the operation method shown in FIG. 6 may correspond to S1830 and S1831 in FIG. 18.

Also, in the example shown in FIG. 18, when the display apparatus recognizes the user pattern requiring cold-booting and determines that cold-booting is necessary in operation S1830, the display apparatus does not directly start rebooting in S1831 but may output a user interface to inquire the intention of the user as shown in FIG. 17.

Figure 19:
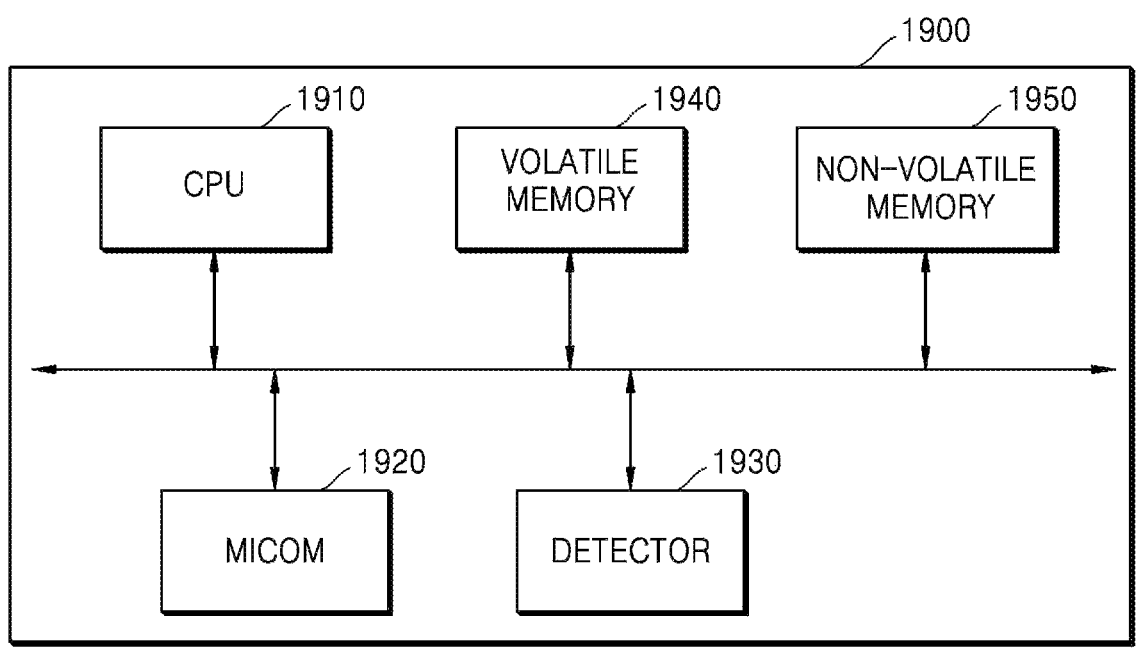
FIG. 19 is a schematic block diagram of an electronic apparatus 1900 that performs boot using a waiting time when receiving a power off input according to an embodiment.

FIG. 19 is a schematic block diagram of an electronic apparatus 1900 that performs booting using a waiting time when receiving a power off input according to an embodiment.

Referring to FIG. 19, the electronic apparatus 1900 includes a CPU 1910, a microcomputer 1920, a sensor 1930, a volatile memory 1940, and a nonvolatile memory 1950.

The CPU 1910 may perform overall control of components of the electronic apparatus 1900 and may perform cold booting or warm booting according to instructions of the microcomputer 1920. Cold booting may include loading a program necessary for initialization, such as an operating system stored in the nonvolatile memory 1950, etc., into the volatile memory 1940 to perform a booting operation. Warm booting may include performing a boot operation based on a program necessary for initialization, such as an operating system stored in the volatile memory 1940, etc.

The microcomputer 1920 includes a microprocessor separate from the CPU 1910 that continuously operates even when the electronic apparatus 1900 is powered off, without interruption of a power supply. The microcomputer 1920 may count a waiting time from the power off input of the electronic apparatus 1900 to a next power on input. Then, when the power on input of the electronic apparatus 1900 is received, the microcomputer 1920 checks the counted waiting time and checks whether the waiting time exceeds a predetermined threshold value.

As a result of comparison, when the waiting time exceeds the threshold value, the microcomputer 1920 determines that a possibility of error occurrence is low in the electronic apparatus 1900 and instructs the CPU 1910 to perform normal booting. For example, the microcomputer 1920 may instruct the CPU 1910 to perform instant on booting or warm booting.

As a result of comparison, when the waiting time does not exceed the threshold value, the microcomputer 1920 determines that the possibility of error occurrence is high in the electronic apparatus 1900 and controls discontinuing the power supply to the volatile memory 1940. When the power supply to the volatile memory 1940 is blocked, content maintained in the volatile memory 1940 may be removed, and thus an error state may be eliminated. The microcomputer 1920 may instruct the CPU 1910 to perform cold booting.

The sensor 1930 senses a user input such as power on or power off of the electronic apparatus 1900.

The volatile memory 1940 is a memory such as a RAM and maintains the content stored in the volatile memory 1940 as long as the power supply to the volatile memory 1940 is maintained. When the power supply to the volatile memory 1940 is stopped, the content stored in the volatile memory 1940 is removed.

Unlike the volatile memory 1940, the nonvolatile memory 1950 is a memory that always stores the stored content irrespective of whether the power supply is blocked, and, for example, may include a flash memory or the like.

Figure 20:
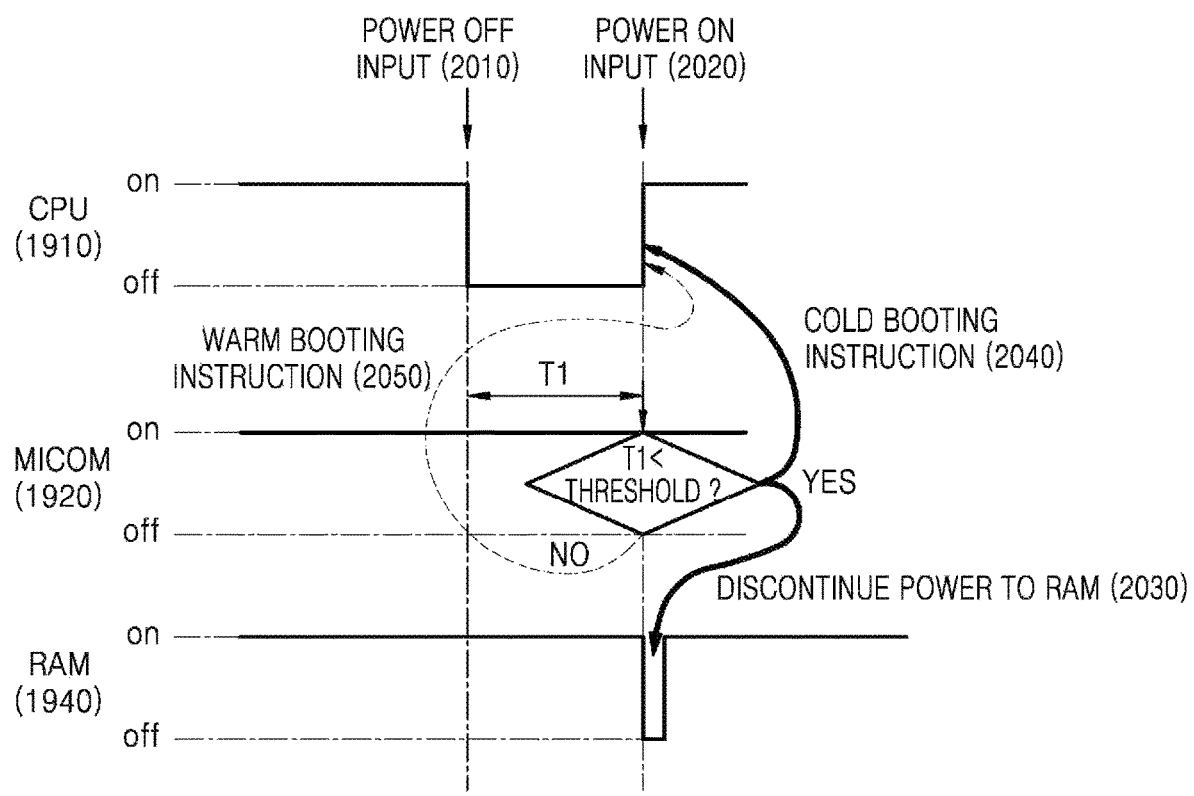
FIG. 20 is a reference diagram for explaining an operation of the electronic apparatus 1900 according to FIG. 19.

FIG. 20 is a reference diagram for explaining an operation of the electronic apparatus 1900 according to FIG. 19.

Referring to FIG. 20, when the electronic apparatus 1900 receives a power off input 2010, the CPU 1910 performs a power off operation. At this time, the microcomputer 1920 may continue to maintain a power on state to count the waiting time T even when the electronic apparatus 1900 is powered off. And, the electronic apparatus 1900 may maintain a power supply to the RAM 1940 of the electronic apparatus 1900 for realizing an instant on boot function such that content stored in the RAM 1940 may be maintained without being removed.

Next, when the electronic apparatus 1900 receives a power on input 2020, the microcomputer 1920 first checks the time T1 from the power off input 2010 to the power on input 2020 to determine whether the time T1 exceeds a threshold value. When the time T1 does not exceed the threshold value, that is, when it is determined that a waiting time T1 is short, the microcomputer 1920 may perform cold booting control by considering that a possibility of error occurrence is high in the electronic apparatus 1900. Specifically, the microcomputer 1920 may control power block 2030 to the RAM 1940 in order to remove the content stored in the RAM 1940. By blocking the power to the RAM 1940, the content stored in the RAM 1940 is removed, thereby removing error possible content from the RAM 1940. Next, the microcomputer 1920 may send a cold booting instruction 2040 to the CPU 1910. The CPU 1910 receiving the cold boot instruction 2040 performs a boot operation by loading an initialization program such as an operating system stored in the nonvolatile memory into the RAM 1940.

When the waiting time T1 exceeds the threshold value, that is, when it is determined that the waiting time T is not short, the microcomputer 1920 may perform warm booting control by considering that the possibility of error occurrence is low in the electronic apparatus 1900. Specifically, when the microcomputer 1920 sends a warm booting instruction 2050 to the CPU 1910, the CPU 1910 performs a booting operation based on the content stored in the RAM 1940.

According to embodiments, in a situation that a problem occurs during an operation of a display apparatus to which an instant-on booting technology is applied, when a user repeatedly turns a power key on and off to solve the problem, a pattern in which the user presses the power key may be analyzed, thereby automatically recovering an operation error problem of the display apparatus by determining the cold-booting intention of the user itself.

The method of operating the display apparatus according to an embodiment may also be embodied as programmed commands to be executed in various computer units, and then may be recorded in a computer-readable recording medium. The computer-readable recording medium may include one or more of the programmed commands, data files, data structures, or the like. The programmed commands recorded to the computer-readable recording medium may be particularly designed or configured for the present disclosure or may be well known to one of ordinary skill in the art. Examples of the computer-readable recording medium include magnetic media including hard disks, magnetic tapes, and floppy disks, optical media including CD-ROMs and DVDs, magneto-optical media including floptical disks, and hardware designed to store and execute the programmed commands in ROM, RAM, a flash memory, and the like. Examples of the programmed commands include not only machine code generated by a compiler but also include a high-level programming language to be executed in a computer by using an interpreter.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
a user input interface;
a memory storing one or more instructions; and
a processor configured to execute the one or more instructions stored in the memory to:
   receive a power input of the display apparatus via the user input interface,
   obtain operating time information of the display apparatus, the operating time information of the display apparatus comprising at least one of:
      information about operation time of the display apparatus indicating a period of time during which the display apparatus is powered on prior to receiving the power input and
   information about waiting time of the display apparatus indicating a period of time during which the display apparatus is powered off prior to receiving the power input,
   in response to receiving the power input, determine whether to perform a cold-booting operation based on the operating time information, and
   perform the cold-booting operation in response to determining to perform the cold-booting operation.

2. The display apparatus of claim 1, further comprising:
a volatile memory,
wherein the cold-booting operation comprises:
an operation of cold power-off the display apparatus in which power to the volatile memory is discontinued; and
an operation of booting the display apparatus.

3. The display apparatus of claim 1, wherein the power input comprises a first power input and a second power input,
wherein the processor is further configured to execute the one or more instructions to:
in response to receiving the second power input, obtain first time information indicating a time between the first power input and the second power input,
determine whether the first time information corresponds to a predetermined first pattern, and
determine whether to perform the cold-booting operation of the display apparatus based on whether the first time information corresponds to the predetermined first pattern.

4. The display apparatus of claim 3, wherein when the first power input is an input to power-off of the display apparatus and the second power input is an input to power-on of the display apparatus, the first time information indicates a waiting time of the display apparatus, and
wherein when the first power input is an input to power-on of the display apparatus and the second power input is an input to power-off of the display apparatus, the first time information indicates an operation time of the display apparatus.

5. The display apparatus of claim 1, wherein the processor is further configured to:
in response to the power input indicating a power off, determine whether the one or more operation times of the display apparatus is less than a first threshold, and perform the cold-booting operation based on the determination that the operation time of the display apparatus is less than the first threshold, and
in response to the power input indicating a power on, determine whether the waiting time of the display apparatus is less than a second threshold, and perform the cold-booting operation based on the determination that the waiting time of the display apparatus is less than the second threshold.

6. The display apparatus of claim 5, wherein at least one of the first threshold and the second threshold is updatable by a server or according to a result determined by machine learning.

7. The display apparatus of claim 1, wherein the power input comprises a first power input, a second power input, and a third power input, and
wherein the processor is further configured to execute the one or more instructions to:
in response to receiving the third power input, obtain first time information indicating a time between the first power input and the second power input and second time information indicating a time between the second power input and the third power input,
determine at least one of: whether the first time information corresponds to a predetermined first pattern and whether the second time information corresponds to a predetermined second pattern, and
determine whether to perform the cold-booting operation of the display apparatus in accordance with a determination result as to whether the at least one of the first time information corresponds to the predetermined first pattern and the second time information corresponds to the predetermined second pattern.

8. The display apparatus of claim 7, wherein the processor is further configured to execute the one or more instructions to determine to perform the cold-booting operation when it is determined that the first time information is less than a first threshold value or the second time information is less than a second threshold value.

9. The display apparatus of claim 1, wherein the power input comprises a first power input and a second power input, and wherein the processor is configured to execute the one or more instructions to:
in response to receiving the first power input, switch to an information mode in which information is displayed on a display by executing a predetermined application set to be executed in correspondence to the first power input, and
in response to receiving the second power input, switch to a normal mode in which an application that was being executed on the display apparatus before the first power input is continuously executed.

10. A method of operating a display apparatus, the method comprising:
receiving a power input of the display apparatus;
obtaining operating time information of the display apparatus, the operating time information of the display apparatus comprising at least one of:
information about operation time of the display apparatus indicating a period of time during which the display apparatus is powered on prior to receiving the power input and
information about waiting time of the display apparatus indicating a period of time during which the display apparatus is powered off prior to receiving the power input;
in response to receiving the power input, determining whether to perform a cold-booting operation based on the operating time information; and
performing the cold-booting operation in response to determining to perform the cold-booting operation.

11. The method of claim 10, wherein the cold-booting operation comprises:
an operation of a cold power-off the display apparatus in which power to a volatile memory of the display apparatus is discontinued; and
an operation of booting the display apparatus.

12. The method of claim 10, wherein the power input comprises a first power input and a second power input, and wherein the method further comprises:
in response to receiving the second power input, obtaining first time information indicating a time between the first power input and second power input;
determining whether the first time information corresponds to a predetermined first pattern; and
determining whether to perform the cold-booting operation of the display apparatus based on whether the first time information corresponds to the predetermined first patter.

13. The method of claim 12, wherein when the first power in put is an input to power-off of the display apparatus and the second power input is an input to power-on of the display apparatus, the first time information indicates a waiting time of the display apparatus, and
wherein when the first power input is an input to power-on of the display apparatus and the second power input is an input to power-off of the display apparatus, the first time information indicates an operation time of the display apparatus.

14. The method of claim 10, further comprising:
in response to the power input indicating a power off, determining whether the operation time of the display apparatus is less than a first threshold, and performing the cold-booting operation based on the determination that the operation time of the display apparatus is less than the first threshold, and
in response to the power in put indicating a power on, determining whether the waiting time of the display apparatus is less than a second threshold, and performing the cold-booting operation based on the determination that the waiting time of the display apparatus is less than the second threshold.

15. The method of claim 14, wherein at least one of the first threshold and the second threshold is updatable by a server or according to a result determined by machine learning.

16. The method of claim 10, wherein the power input comprises a first power input, a second power input, and a third power input, and wherein the method further comprises:
in response to receiving the third power input, obtaining first time information indicating a time between the first power input and the second power input and second time information indicating a time between the second power input and the third power input;
determining at least one of: whether the first time information corresponds to a predetermined first pattern and whether the second time information corresponds to a predetermined second pattern; and
determining whether to perform the cold-booting operation of the display apparatus in accordance with a result of the determining whether the at least one of the first time information corresponds to the predetermined first pattern and the second time information corresponds to the predetermined second pattern.

17. The method of claim 16, further comprising:
determining to perform the cold-booting operation when it is determined that the first time information is less than a first threshold value and the second time information is less than a second threshold value.

* * * * *